(12) United States Patent
Gschwind

(10) Patent No.: US 10,061,572 B2
(45) Date of Patent: *Aug. 28, 2018

(54) RECONFIGURATION OF ADDRESS SPACE BASED ON LOADING SHORT POINTER MODE APPLICATION

(71) Applicant: INTERNATIONAL BUSINESS MACHINES CORPORATION, Armonk, NY (US)

(72) Inventor: Michael K. Gschwind, Chappaqua, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/828,634

(22) Filed: Dec. 1, 2017

(65) Prior Publication Data

US 2018/0088919 A1    Mar. 29, 2018

Related U.S. Application Data

(63) Continuation of application No. 15/216,896, filed on Jul. 22, 2016, now Pat. No. 9,836,291.

(51) Int. Cl.
   *G06F 9/45*      (2006.01)
   *G06F 8/41*      (2018.01)

(52) U.S. Cl.
   CPC .............. *G06F 8/447* (2013.01); *G06F 8/441* (2013.01)

(58) Field of Classification Search
   CPC ......................................... G06F 9/45
   USPC ................................ 717/136–154
   See application file for complete search history.

(56) References Cited

U.S. PATENT DOCUMENTS

| 4,503,492 | A  |   | 3/1985  | Pilat |
| 6,199,202 | B1 |   | 3/2001  | Coutant |
| 6,499,137 | B1 | * | 12/2002 | Hunt ................... G06F 9/44521 717/164 |
| 6,502,181 | B1 | * | 12/2002 | MacKenna ............... G06F 9/30 703/26 |
| 8,656,139 | B2 |   | 2/2014  | Meier et al. |

(Continued)

FOREIGN PATENT DOCUMENTS

| EP | 0208429 A2      | 6/1986 |
| WO | WO2012123866 A3 | 9/2012 |

OTHER PUBLICATIONS

Notice of Allowance for U.S. Appl. No. 15/216,896 dated Aug. 2, 2017, pp. 1-20.

(Continued)

*Primary Examiner* — Jae Jeon
(74) *Attorney, Agent, or Firm* — Steven Chiu, Esq.; Blanche E. Schiller, Esq.; Heslin Rothenberg Farley & Mesiti P.C.

(57) ABSTRACT

A short pointer mode application has been loaded. Based on determining that the short pointer mode application has been loaded, an address space configured for a long pointer mode environment is reconfigured. The address space has one portion addressable by short pointers of a defined size and another portion addressable by long pointers of another defined size, and the reconfiguring includes obtaining a long pointer library, and loading the long pointer library in the one portion of the address space addressable by short pointers.

20 Claims, 18 Drawing Sheets

(56) References Cited

U.S. PATENT DOCUMENTS

| | | | |
|---|---|---|---|
| 9,569,234 B2 | 2/2017 | De | |
| 9,836,291 B1 | 12/2017 | Gschwind | |
| 2009/0119321 A1 | 5/2009 | Mitran | |
| 2010/0269034 A1 | 10/2010 | Onodera et al. | |
| 2012/0233414 A1* | 9/2012 | Meier | G06F 9/30043 |
| | | | 711/154 |
| 2016/0092702 A1 | 3/2016 | Durham et al. | |
| 2018/0024765 A1 | 1/2018 | Gschwind | |
| 2018/0024834 A1 | 1/2018 | Gschwind | |

OTHER PUBLICATIONS

Mel, Peter and Tim Grance, "The NIST Definition of Cloud Computing," National Institute of Standards and Technology, Information Technology Laboratory, Special Publication 800-145, Sep. 2011, pp. 1-7.

IBM, "z/Architecture—Principles of Operation," IBM Publication No. SA22-7832-10, Eleventh Edition, Mar. 2015, pp. 1-1732.

IBM, "Power ISA, V.2.07B," Apr. 9, 2016, pp. 1-1527.

Fin, T.H., et al., "Loosely Coupled Shared Pointer for Two Persons," IP.com No. IPCOM000101194, Jul. 1, 1990, pp. 152-155 (+ cover).

Hirose, et al., "A Mechanism for Discriminating Patterns of Pointer Trails," IP.com No. IPCOM000123282, Aug. 1, 1998, pp. 1-2 (+ cover).

IBM, "Validating Method for Hierarchical Database Pointers," IP.com No. IPCOM000011922D, Mar. 26, 2003, pp. 1-4 (+ cover).

IBM, "Dynamic Address Re-generation," IP.com No. IPCOM000012263D, Apr. 23, 2003, p. 1 (+ cover).

Skjellum, Anthony, "C/UNIX Programmer's Notebook," Dr. Dobb's Journal, vol. 9, Issue 6, AN-2302240, Jun. 1984, pp. 86-106 (+ cover).

Hewlett-Packard, "The 32-bit PA-RISC Run-time Architecture Document," 11.0 version 1.0, 1997 (no further date information available), pp. 1-274.

Gschwind, Michael K., "Short Pointer Mode Applications in Long Pointer Mode Environments," U.S. Appl. No. 15/216,850, filed Jul. 22, 2016, pp. 1-71.

Gschwind, Michael K., "Reconfiguration of Address Space Based on Loading Short Pointer Mode Application", U.S. Appl. No. 15/216,896, filed Jul. 22, 2016, pp. 1-71.

Gschwind, Michael K., "Short Pointer Mode Applications in Long Pointer Mode Environments", U.S. Appl. No. 15/803,256, filed Nov. 3, 2017, pp. 1-66.

List of IBM Patents or Patent Applications Treated as Related, Jan. 2, 2018, pp. 1-2.

Lee, Ruby et al., "64-Bit and Multimedia Extensions in the PA-RISC 2.0 Architecture," Proceedings of COMPCON '96, Feb. 1996, pp. 152-160.

* cited by examiner

RECONFIGURATION OF ADDRESS SPACE BASED ON LOADING SHORT POINTER MODE APPLICATION

This application is a continuation of co-pending U.S. Ser. No. 15/216,896, entitled "RECONFIGURATION OF ADDRESS SPACE BASED ON LOADING SHORT POINTER MODE APPLICATION," filed Jul. 22, 2016, which is hereby incorporated herein by reference in its entirety.

BACKGROUND

One or more aspects relate, in general, to processing within a computing environment, and in particular, to processing associated with long and short pointers.

Many architectures, including the z/Architecture and Power architecture offered by International Business Machines Corporation, Armonk, N.Y., offer multiple Application Binary Interface (ABI) environments. For instance, the z/Architecture environment ships a 31-bit (31b) environment in addition to a 64-bit (64b) environment. Similarly, POWER ships 32-bit (32b) and 64-bit (64b) environments. These environments are implemented by a multi-library (multilib) approach, in which multiple libraries, middleware and build tools are provided, one for each environment, that all refer to the same system functions. Other architectures similarly provide a multilib approach.

In each environment, pointers are used to reference objects. For instance, in 31-bit or 32-bit environments, short pointers (e.g., 31b or 32b pointers) are used which contain offsets to objects local to its processes. Similarly, in 64-bit environments, long pointers (e.g., 64b pointers) are used that point to objects that may be outside the current address space.

Development and distribution of multiple system libraries increases developer maintenance, as well as build and debug costs, and increases the support that is to be provided to subsystems that are shipped.

SUMMARY

Shortcomings of the prior art are overcome and additional advantages are provided through the provision of a computer program product for facilitating processing in a computing environment. The computer program product comprises a storage medium readable by a processing circuit and storing instructions for performing a method. The method includes, for instance, determining that a short pointer mode application has been loaded; and reconfiguring, based on determining the short pointer mode application has been loaded, an address space configured for a long pointer mode environment, the address space having one portion addressable by short pointers of a defined size and another portion addressable by long pointers of another defined size, the reconfiguring including: obtaining a long pointer library; and loading the long pointer library in the one portion of the address space addressable by short pointers. The reconfiguring facilitates execution of a short pointer mode application in a long pointer mode environment.

As an example, the determining of the whether a short pointer mode application has been loaded includes checking a field associated with of the application.

In one example, the defined size of the one portion of the address space is 31 bits or 32 bits, and the other defined size of the other portion of the address space is 64 bits.

In one embodiment, the short pointer mode application is loaded in the one portion of the address space addressable by short pointers.

Further, in another embodiment, the reconfiguring includes configuring a stack in the one portion of the address space addressable by short pointers.

In yet another embodiment, the reconfiguring further includes configuring a heap in the one portion of the address space addressable by short pointers.

In one aspect, a select library to load is obtained, and a determination is made as to whether the select library is a short pointer library. Based on the select library being a short pointer library, the select library is loaded in the one portion of the address space addressable by short pointers.

Further, based on the select library not being a short pointer library, the select library is loaded in the other portion of the address space.

In a further aspect, the select library is loaded in the one portion of the address space or the other portion of the address space, based on the select library not being a short pointer library; and the select library modifies one or more characteristics of the select library for the select library to be operable in a short mode environment.

In one example, a pointer of the long pointer library is a procedure linkage table pointer, and the procedure linkage table pointer is a long pointer.

Methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

In accordance with one or more aspects, a capability is provided to enable short pointer mode applications (i.e., applications that use short pointers) to execute in a long pointer mode environment. Short pointers are of one size (e.g., 31b or 32b) and long pointers are of another size (e.g., 64b), different from the one size.

As indicated above, development and distribution of multiple system libraries increases developer maintenance, build and debug costs, as well as increases support that is to be provided to subsystems that are shipped. In an attempt to address this, interposer libraries have been used to bridge between differences in interfaces, e.g., by translating from one size of data (e.g., pointers) to another size of data. However, the interposer libraries simply replace one set of libraries that needs to be built, debugged and maintained distinctly for a short pointer mode environment with another set of libraries that needs to be written, built, debugged and maintained. Therefore, a capability is needed to reduce the number of build environments provided, e.g., such that, in one aspect, a single environment and library set is distributed for each architecture, while retaining the advantages of short pointer modes and without the need to build another set of libraries, including interposer libraries.

One embodiment of a computing environment to incorporate and use one or more aspects of the present invention is described with reference to FIG. 1. In one example, the computing environment is based on the z/Architecture, offered by International Business Machines Corporation, Armonk, N.Y. One embodiment of the z/Architecture is described in "z/Architecture Principles of Operation," IBM Publication No. SA22-7832-10, March 2015, which is hereby incorporated herein by reference in its entirety. Z/ARCHITECTURE is a registered trademark of International Business Machines Corporation, Armonk, N.Y., USA.

In another example, the computing environment is based on the Power Architecture, offered by International Business Machines Corporation, Armonk, N.Y. One embodiment of the Power Architecture is described in "Power ISA™ Version 2.07B," International Business Machines Corporation, Apr. 9, 2015, which is hereby incorporated herein by reference in its entirety. POWER ARCHITECTURE is a registered trademark of International Business Machines Corporation, Armonk, N.Y., USA.

The computing environment may also be based on other architectures, including, but not limited to, the Intel x86 architectures. Other examples also exist.

Figure 1:
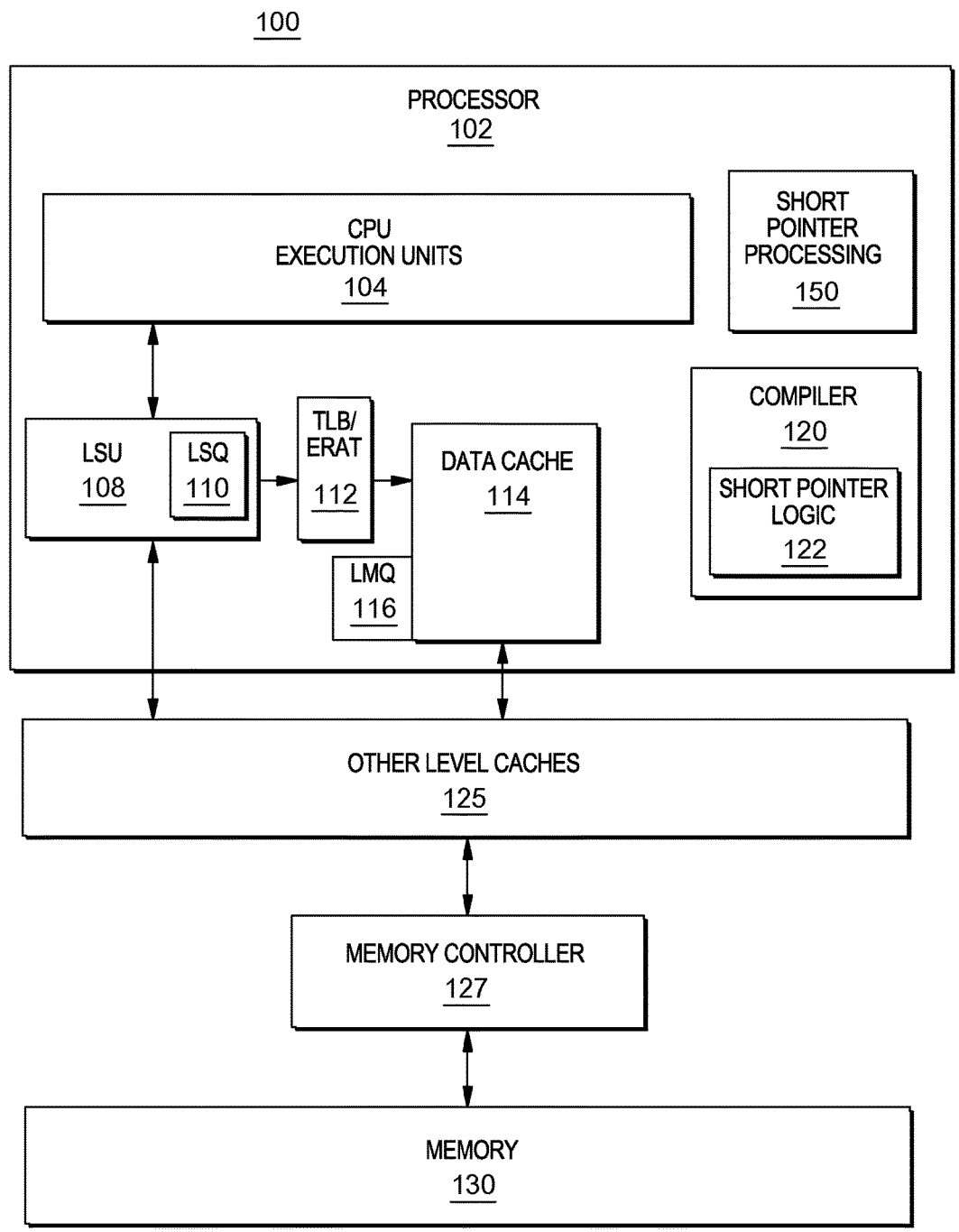
FIG. 1 depicts one example of a computing environment to incorporate and use one or more aspects of the present invention.

Referring to FIG. 1, in one example, a computing environment 100 includes at least one central processing unit (CPU) 102 (a.k.a., a processor) coupled to one or more levels of caches 125. Central processing unit 102 includes, for instance, one or more execution units 104 to request and consume data. Execution units 104 are coupled to a load/store unit (LSU) 108, which includes a load/store queue (LSQ) 110. Load/store unit 108 issues memory access operations (loads and stores) that retrieve prefetched data or cause the data to be fetched from the memory subsystem. LSU 108 may be coupled to a data cache 114 via, e.g., a translation mechanism 112, indicated as, e.g., a translation look-aside buffer (TLB) or an effective to real address translation table (ERAT).

Further CPU 102 may execute a compiler 120 to compile programs, and the compiler may use short pointer logic 122, as described herein, to facilitate processing of short pointer mode applications in a long pointer mode environment. Additionally, other modules or managers executing on the CPU, such as a library manager, may implement short pointer processing 150.

CPU 102 is coupled to and communicates with a memory hierarchy that includes, for instance, data cache 114, which is an L1 data cache; one or more other level caches 125, which may include a single level two (L2) cache or multiple other sequentially numbered levels, e.g., L3, L4; a memory 130; and an associated memory controller 127, which controls accesses to memory 130. L1 data cache 114 serves as a prefetch buffer for data (and/or data streams) that are prefetched. L1 data cache has a corresponding load miss queue (LMQ) 116, which the cache utilizes to save information about ongoing prefetch requests.

In addition to the example memory hierarchy, computing environment 100 may also include additional storage devices that form a part of the memory hierarchy from the perspective of CPU 102. The storage devices may be one or more electronic storage media, such as a floppy disk, hard drive, CD-ROM, or DVD. CPU 102 communicates with each of the above devices within the memory hierarchy by various mechanisms, including via buses and/or direct channels, as examples.

In accordance with an aspect of the present invention, a short pointer mode (a.k.a., short mode) application executes in a long pointer mode (a.k.a., long mode) environment. The application uses, for instance, 31-bit or 32-bit pointers. When the application calls a function, it passes pointers in a zero extended manner in, for instance, a long register (e.g., a 64-bit register). The short data (e.g., 31-bit or 32-bit data) is loaded in a long (e.g., 64-bit) register at no extra cost as long data. In one example, this is accomplished using a load logical instruction, as described herein. The low order bits of an application pointer correspond to those bits used by the short pointer.

In one aspect, in order for a short mode application to execute in a long mode environment, a compilation process is performed, in accordance with an aspect of the present invention. One embodiment of this compilation process is described with reference to FIG. 2, and is performed by, e.g., compiler 120 executing on processor 102.

Figure 2:
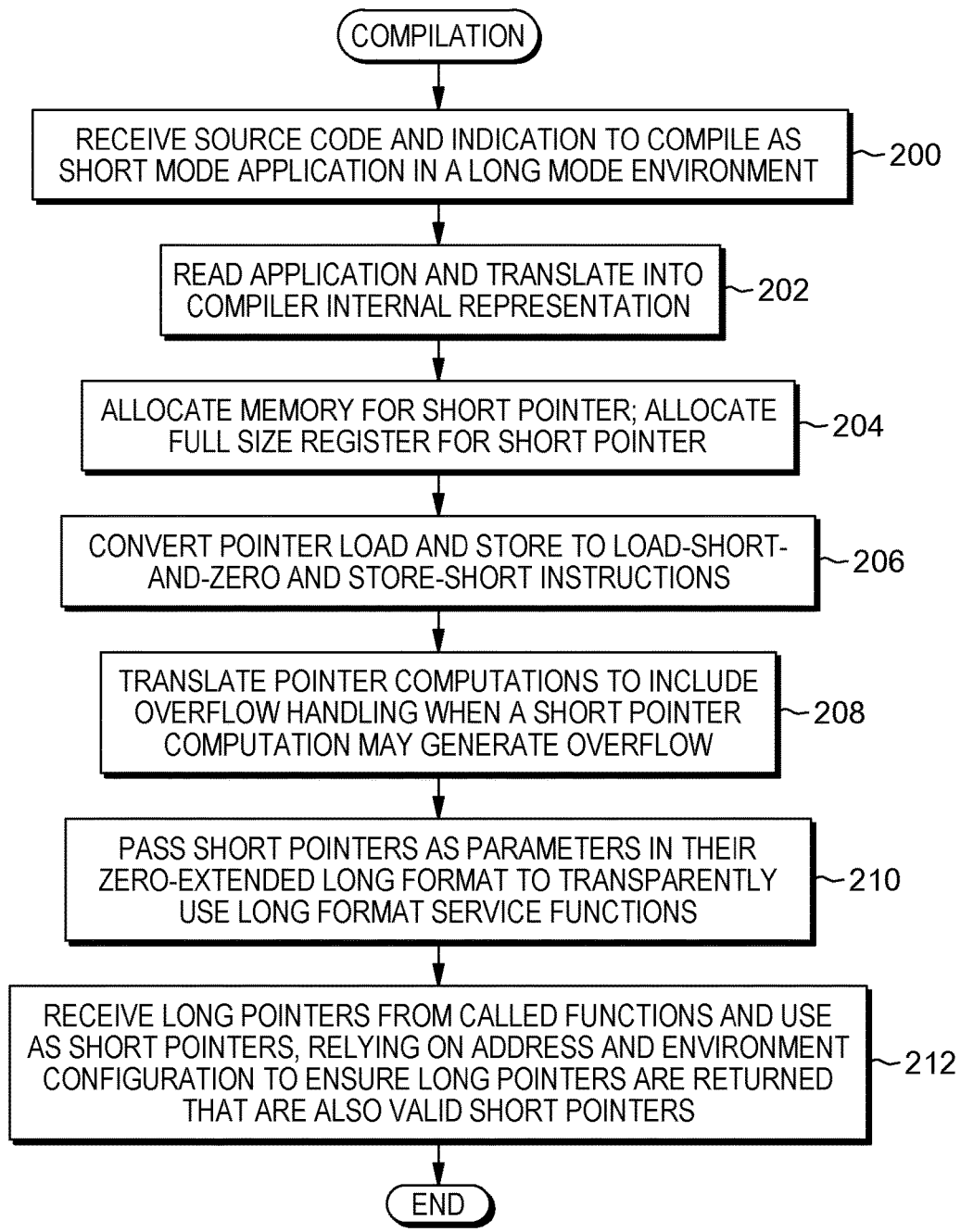
FIG. 2 depicts one example of an application compilation process, in accordance with an aspect of the present invention.

Referring to FIG. 2, the compiler receives source code of an application to be compiled, as well as an indication that the application is a short mode application that is to be executed in a long mode environment, STEP 200. The compiler reads the application and translates it into an internal representation (IR), as is known, STEP 202. Further, for each in-memory pointer in the application, the compiler allocates an amount of memory for the pointer that is the size of a short pointer; and for each register pointer, the compiler provides a full size register (e.g., 64-bits) for the short pointer, STEP 204. For instance, for a 32-bit in-memory pointer, the compiler allocates 32 bits of memory, but for a 32-bit register pointer, a 64-bit register is provided.

Additionally, load and store instructions that typically load or store data in a long mode (e.g., 64b) are converted to load-short-and-zero and store-short instructions, respectively, STEP 206. In particular, the compiler replaces, e.g., the load instruction with a load-short- and zero instruction (e.g., referred to as load logical in the z/Architecture). In one example, the load-short-and-zero instruction includes a load zero extending data instruction, in which data in a short mode (e.g., 31b or 32b) is loaded into the register, and then zeros are appended to provide long mode data (e.g., 64 bits). In another embodiment, a load-short-and-sign-extend instruction may be used.

Further, in one example, the compiler replaces, e.g., a store relative long instruction with a store-short instruction (which in, for instance, the z/Architecture is a Store instruction). The store-short instruction stores low order bits of a register, in which data in a short mode (e.g., 31b or 32b) is stored to memory while high order bits are ignored. In other embodiments, store-short instructions may be used to ensure that no significant bits are dropped, e.g., by ensuring that ignored high order bits are, for example, one of an extended sign bit and/or a zero bit. In one or more of the embodiments, special pointer conversion instructions are not used, simplifying the Instruction Set Architecture (ISA) that is employed. Instead, load and store instructions typically provided in the ISA may be used.

Optionally, the compiler may translate pointer computations to include overflow handling when a short pointer computation may generate an overflow, STEP 208, as described below.

Additionally, short pointers are passed as parameters in their zero-extended long format to use long format service functions, STEP 210. For instance, register parameters are automatically passed in the long format, and in-memory pointer parameters are passed using, for instance, load and store instructions that load or access a long pointer representation in a parameter list holding an image of the long form register representation of a parameter.

In one example, short pointer computations are maintained in registers in a zero-extended long format, such that they represent a memory access address usable with long pointer memory access instructions, e.g., in accordance with an address space layout for a short mode application in a long mode environment, in accordance with an aspect of the present invention.

Moreover, long pointers may be received from called functions and are used as short pointers, STEP 212. This relies on configuring the address spaces and environment to ensure long pointers are returned that are also valid short pointers.

Further details regarding various of the processes described above for the compilation technique are described with reference to FIGS. 3-7. The logic of each of the figures is performed by, e.g., compiler 120 executing on the processor, in one example.

Figure 3:
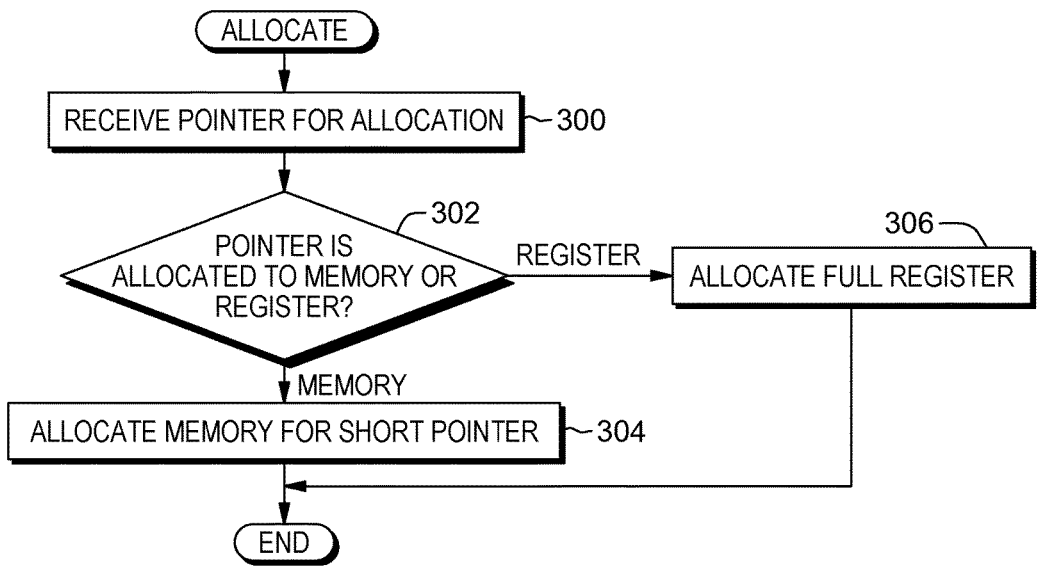
FIG. 3 depicts one example of logic to allocate memory and/or a register for a short pointer, in accordance with an aspect of the present invention.

Referring to FIG. 3, further details regarding allocation of memory and/or registers for short pointers are described. Initially, the compiler receives a pointer for which allocation is to be performed, STEP 300. A determination is made as to whether the pointer is to be allocated in memory or in a register (e.g., in a central processing unit), INQUIRY 302. If memory is to be allocated for the pointer, then an amount of memory is allocated for a short pointer (e.g., 31 or 32 bits), STEP 304. However, if a register is to be allocated for the pointer, then a full register (e.g., 64-bit register) is allocated for the pointer, STEP 306. In this example, the short pointer when placed in the register will be appended with zeros (e.g., the first 33 or 32 bits will be zeros, depending on whether the short pointer is 31 or 32 bits). This process is performed for each pointer received by the compiler.

Further details regarding converting pointer load and/or store instructions are described with reference to FIG. 4A. Initially, a request is received to generate code for a pointer move in accordance with a compiler-based code generation from the source code and/or an internal compiler representation thereof, STEP 400. A determination is made as to whether the pointer is being moved between registers or between a register and memory, INQUIRY 402. If the pointer is being moved between registers (REG/REG), then the pointer is copied to the full register previously allocated, STEP 404. However, if the pointer is to be moved between a register and memory (REG/MEM), then a further determination is made as to whether the pointer is being moved to memory or from memory, INQUIRY 406. If the pointer is being moved from memory, then, in one example, a load short and zero extend instruction is used, STEP 408. In particular, the pointer is stored in the register, and then the remaining positions of the register are filled with zeros.

Figure 4A:
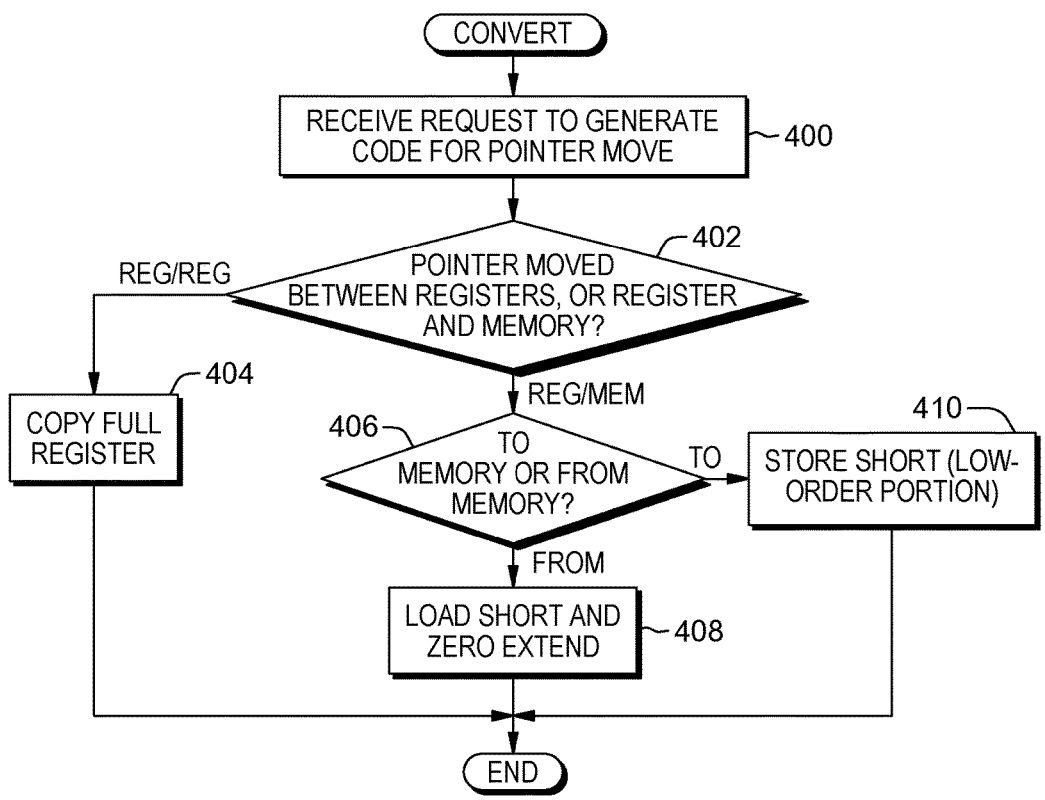
FIG. 4A depicts one example of logic to convert pointer load and store instructions to load-short-and-zero and store short instructions, in accordance with an aspect of the present invention.
Figure 4B:
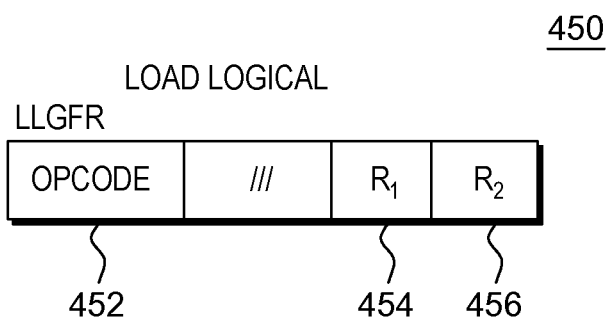
FIG. 4B depicts one example of a Load Logical instruction used in accordance with an aspect of the present invention.

One example of a load short and zero extend instruction is the Load Logical instruction defined in the z/Architecture, an example of which is depicted in FIG. 4B. As shown, in one example, a Load Logical instruction 450 includes an opcode field 452 used to provide an operation code that indicates a load logical operation; a first register field ($R_1$) 454; and a second register field ($R_2$) 456.

In operation, the contents of the register designated by $R_1$ field 454 are stored unchanged at the second operand address. The contents of the register designated by $R_2$ field 456 specify the second operand address.

Figure 4C:
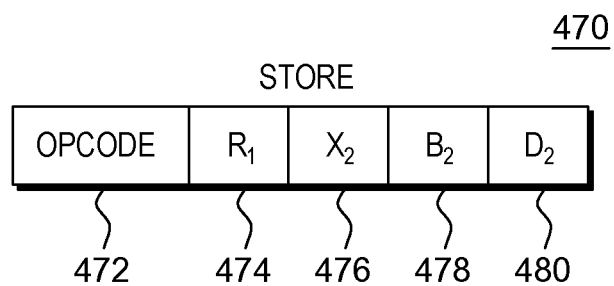
FIG. 4C depicts one example of a Store instruction used in accordance with an aspect of the present invention.

Returning to INQUIRY 406 of FIG. 4A, if the pointer is being moved to memory, then, in one example, a store instruction is used to store the short (low order portion) in memory, STEP 410. One example of a store-short instruction is the Store instruction defined in the z/Architecture, an example of which is depicted in FIG. 4C. As shown, in one example, a Store instruction 470 includes an opcode field 472 used to provide an operation code that indicates a store short operation (e.g., stores 32 low order bits); a register field ($R_1$) 474; an index field ($X_2$) 476; a base field ($B_2$) 478; and a displacement field ($D_2$) 480.

In operation, the first operand (e.g., contents of the register specified in $R_1$) is placed unchanged at the second operand location, defined by $X_2$, $B_2$ and $D_2$. For instance, the contents of the general registers designated by the $X_2$ and $B_2$ fields are added to the contents of the $D_2$ field to provide an address (i.e., the second operand location).

Figure 5:
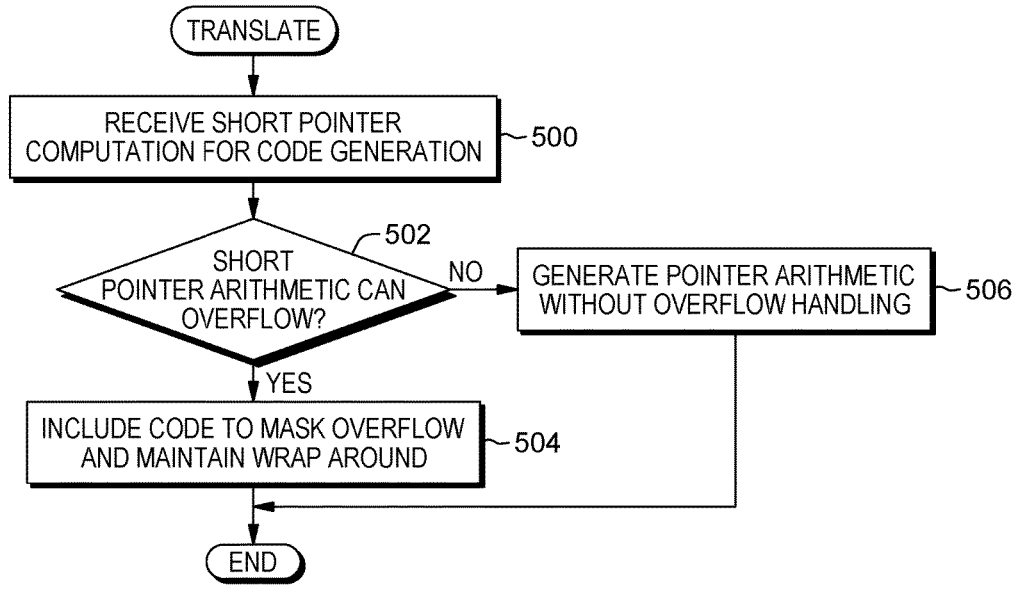
FIG. 5 depicts one example of logic to translate pointer computations, in accordance with an aspect of the present invention.

Referring to FIG. 5, further details regarding pointer arithmetic are described. Initially, the compiler receives a short pointer computation for which code is to be generated, STEP 500. A determination is made as to whether the short pointer arithmetic can overflow (and, in one embodiment, cannot be handled by address mirroring), INQUIRY 502. For instance, in one embodiment, a portion of an address space is mirrored. As an example, this is an entire 32b address space below and/or above the short pointer area, as described below. In other embodiments, this is only a portion thereof. When an address computation is performed that may overflow, but falls within the mirrored range, no overflow handling is necessary. In one embodiment, a check of whether address mirroring may handle an overflow is performed by testing for an add or a subtract of a value that is smaller than the mirrored region—either because the constant is known, or a range of a value is known, e.g., a data size. Thus, for example, when a byte is added to an address, an overflow of no more than 255 bytes can occur, so if at least 255 bytes are mirrored, then mirroring can be determined to handle an address overflow.

If the arithmetic can overflow, then code is included to mask the overflow and maintain wrap around, STEP 504. For instance, the code ensures that the short pointer stays within a short pointer address space, as described below. However, if the short pointer arithmetic is not to overflow, the pointer arithmetic is generated without overflow handling, STEP 506.

Figure 6:
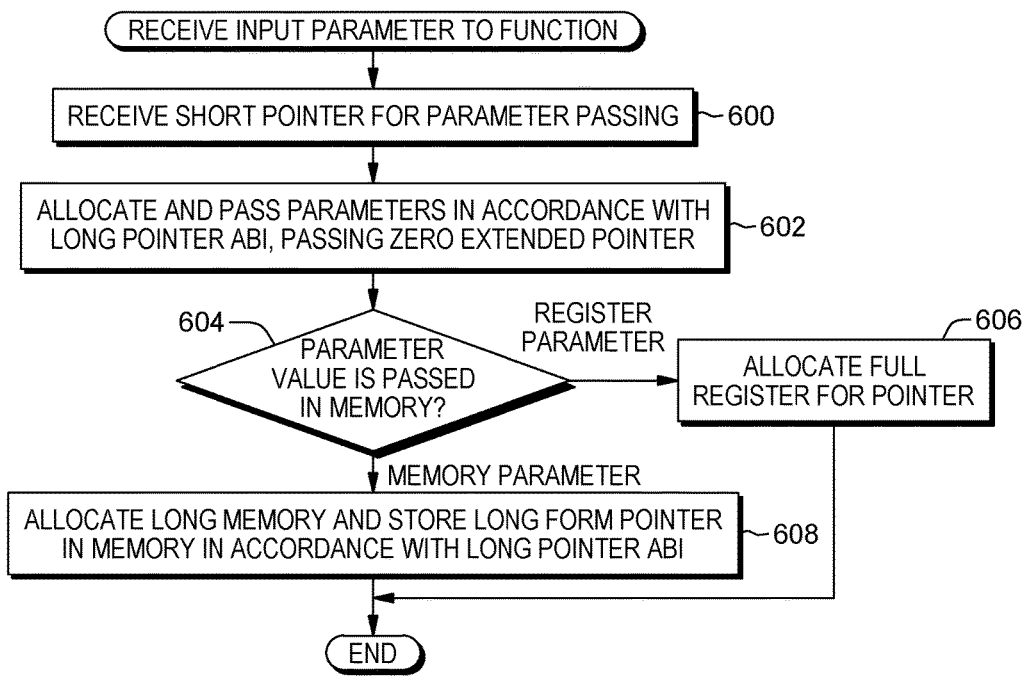
FIG. 6 depicts one example of logic to pass short pointers to parameters in a zero extended long format, in accordance with an aspect of the present invention.

Referring to FIG. 6, further details regarding passing short pointers as parameters in long pointer mode are described. Initially, a short pointer is received for parameter passing, STEP 600. The appropriate parameters are allocated and passed, in accordance with a long pointer ABI, STEP 602. For instance, a determination is made as to whether the parameter value is to be passed in memory, INQUIRY 604. If it is not to be passed in memory, but instead, in a register, then a full register is allocated for the pointer, as described above, STEP 606. Otherwise, if the parameter is to be passed in memory, the memory is allocated for a long pointer and the long pointer is stored in the allocated memory, in accordance with a long pointer ABI, STEP 608. This enables the use of long format service functions, even though the pointers are short pointers.

Figure 7:
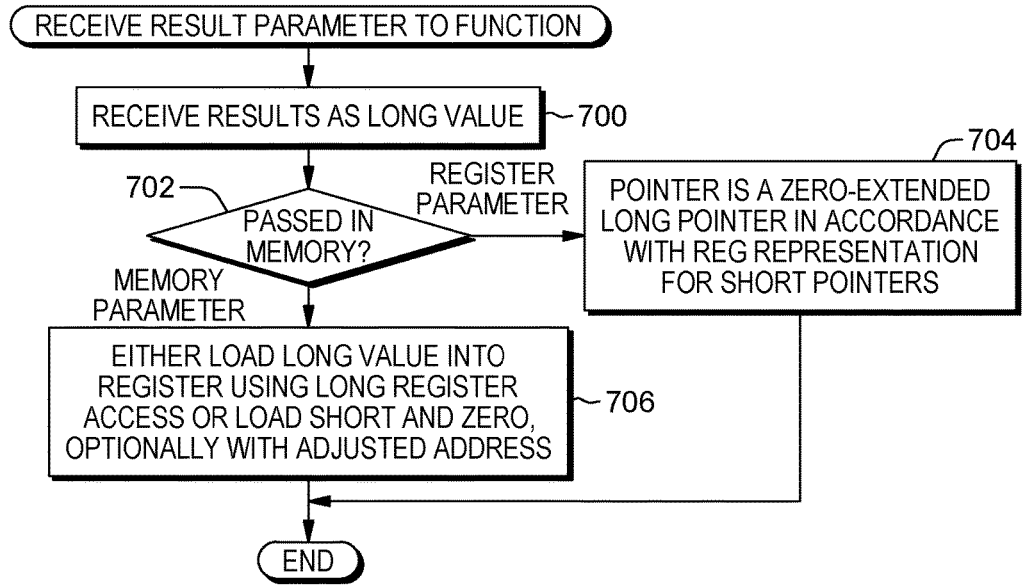
FIG. 7 depicts one example of logic to receive long pointers from called functions and use as short pointers, in accordance with an aspect of the present invention.

In addition to the above in which short pointers are passed as parameters and used as long pointers, long pointers may be received from called functions and used as short pointers, as described further with reference to FIG. 7. Initially, results are received as a long value, STEP 700. A determination is made as to whether the value was passed in memory, INQUIRY 702. If the value was passed in a register parameter, then the pointer is a zero extended long pointer in accordance with register representations for short pointers, STEP 704. Otherwise, if the value was passed as a memory parameter, then either the long value is loaded into a register using a long register access or using load short and zero, optionally with an adjusted address, STEP 706.

As described above, values may be in a long mode or a short mode and may be stored in memory or registers. The storage in memory depends on the type of storage format for a particular architecture. For instance, the z/Architecture uses a Big-Endian format and the POWER architecture uses a Little-Endian format. Examples of storage of long and short values in memory and registers for the different formats are depicted below:

For a long value access:
  In the Big-Endian format the value in memory is:
    0x00000000VARIABLE;
    Load instruction transmits all bytes.
  In the Big-Endian format, the value in a register is:
    0x00000000VARIABLE.
For a long value access:
  In the Little-Endian format the value in memory is:
    0xLEABRIVA00000000;
    Load instruction transmits all bytes.
  In the Little-Endian format, the value in a register is:
    0x00000000VARIABLE.
For a short value access:
  In the Big-Endian format, the value in memory is:
    0x00000000VARIABLE;
    Load instruction transmits short pointer and extends from adjusted address (skip zeros).
  In the Big-Endian format, the value in a register is:
    0x00000000VARIABLE.
    Zero extended.
For a short value access:
  In the Little-Endian format the value in memory is:
    0xLEABRIVA00000000;
    Load instruction transmits short pointer, and extends.
  In the Little-Endian format, the value in a register is:
    0x00000000VARIABLE.
    Zero extended.

In accordance with a further aspect, a check of the high order bits is performed to ensure they are an expected value (e.g., zeros). In particular, when a pointer is returned, only the low order bits are used. Therefore, in one embodiment, a check is made to ensure that the high order bits are zero (or another selected value), corresponding to the selected mapping. In one embodiment, sign extension is used, and the hardware is equipped to recognize when data extends across the 0x80000000 boundary, e.g., by making memory above 0x80000000 inaccessible to induce errors for common incorrect accesses. In one embodiment, an entire range of 2 GB is inaccessible, until 0xFFFFFFFF. This may be accomplished by configuring the address space by not making any storage accessible via page table entries.

As described herein, some pointers are represented as 64 bits. Thus, long pointers are written by writing zero-extended (or otherwise extended) short pointers, and are read by reading the bytes corresponding to short pointers. In one embodiment, high bytes are checked to be zero (or sign copies).

In a further aspect, pointers may be shared between long and short pointer code. For example, a pointer may be shared with a library in memory and that library is defined in long mode, and therefore, expects a long mode pointer. However, it has been defined, in accordance with an aspect of the present invention, the pointers should be short pointers. Therefore, in accordance with a further aspect, the pointer is defined as a shared pointer to be shared with a library, and action is taken based thereon.

One embodiment of logic used to share pointers with a library is described with reference to FIG. 8. In one example, this logic is performed by the compiler (e.g., compiler 120).

Figure 8:
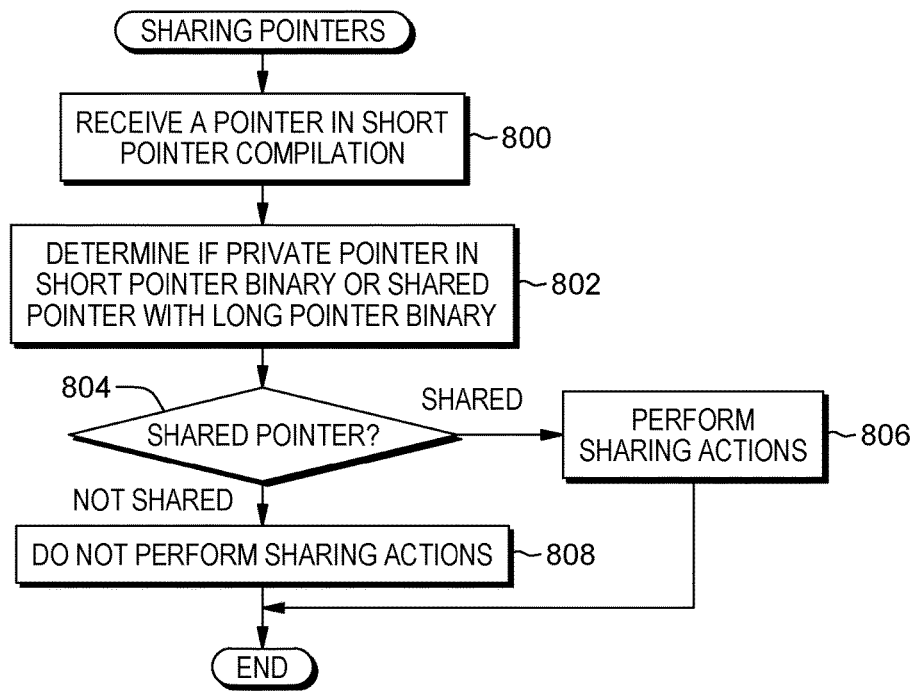
FIG. 8 depicts one example of logic to manage shared pointers, in accordance with an aspect of the present invention.

Referring to FIG. 8, a pointer in short pointer mode is received, STEP 800. A determination is made as to whether the pointer is to be used as a private pointer in a short pointer binary or as a shared pointer with a long pointer binary, STEP 802. That is, is the short mode pointer to be shared with a long mode library in memory. In one embodiment, this is determined by an indication that is provided to indicate how the pointer is to be used. If it is a pointer to be shared with a library, INQUIRY 804, then sharing actions are performed, STEP 806. Otherwise, the pointer is not shared with a library and sharing actions are not performed, STEP 808. Further details regarding sharing are provided below.

In accordance with an aspect of the present invention, there are various options for handling shared pointers, including permitting the sharing or preventing it. In one option, a function may be marked as being not cross-resolvable to a 64b system library so that at runtime, a suitable interception may occur. This is performed by, for instance, storing information in a symbol table to preclude such cross-linking. In another example, a symbol name is modified, e.g., by appending short. In one embodiment, a library might selectively export a second function adapted to process short pointers passed by reference.

Examples of standard functions that receive such a pointer are the following stdio functions found, e.g., in zLinux:
  stdio.h:extern FILE *open_memstream (char**_bufloc, size_t*_sizeloc)_THROW_wur;
  stdio.h:extern int vasprintf (char**_restrict_ptr, _const char*_restrict_f);
  stdio.h:extern int-asprintf (char**_restrict_ptr);
  stdio.h:extern int-asprintf (char**_restric_ptr);
  stdio.h:extern              _IO_ssize_t_getdelim (char**_restrict_lineptr);
  stdio.h:extern              _IO_ssize_t_getdelim (char**_restrict_lineptr);
  stdio.h:extern              _IO_ssize_t_getline (char**_restrict_lineptr).

The above described option includes detecting and preventing sharing when there is a pointer size mismatch that manifests itself when pointers are shared in memory (other than as a pointer specified as a function call parameter when parameter registers have been exhausted). The user/loader is to provide separate short pointer libraries for libraries that share more than pointers in the function calls. Either global pointer variables, or records/structs/classes/unions or other aggregates containing pointers are provided. With this option of preventing sharing, an indication is provided that the environment is not adapted to resolve the situation and an error is raised.

In a further option, pointer data is to be shared with a library other than as input or output parameters specified in a function call, e.g., as a value allocated in memory or as a structure passed as a parameter. In one embodiment, this is handled between code generation and environment configuration. As an example, a short pointer binary recognizes when a pointer is shared, and writes a long pointer by writing it in its zero-extended form or reading it in its zero extended form. In accordance with an aspect of the present invention, the environment is configured such that a long function only generates pointers that are also valid as short pointers. This is not cognizant to the long pointer library which is generated as long pointer code without any allowance for handling short pointers. This is accomplished by having the long pointer library work on long pointers, but allocating storage so the memory locations can be represented as valid short pointers.

Figure 9:
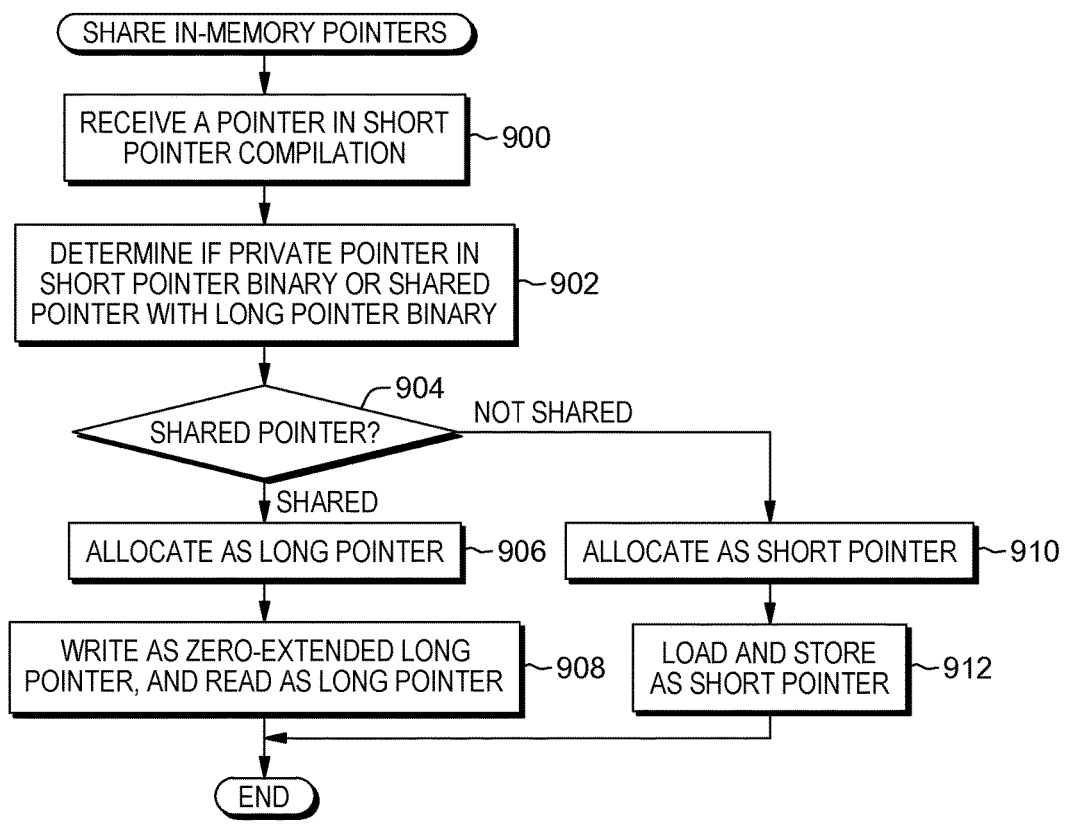
FIG. 9 depicts one example of logic to handle shared in-memory pointers, in accordance with an aspect of the present invention.

One embodiment of logic to share in-memory pointers between short and long pointer binaries is described with reference to FIG. 9. Initially, a pointer is received in a short pointer compilation, STEP 900. A determination is made as to whether the pointer is to be a private pointer in a short pointer binary or a shared pointer with a long pointer binary, STEP 902. If it is a shared pointer, INQUIRY 904, then memory is allocated for the shared pointer as a long pointer (e.g., 64 bits in memory are allocated), STEP 906. The pointer is written as a zero-extended long pointer and read as a long pointer, STEP 908.

However, if the pointer is not a shared pointer, INQUIRY 904, then memory for the private pointer is allocated as a short pointer (e.g., 32 bits in memory are allocated), STEP 910. The pointer is loaded and stored as a short pointer, STEP 912.

Figure 10:
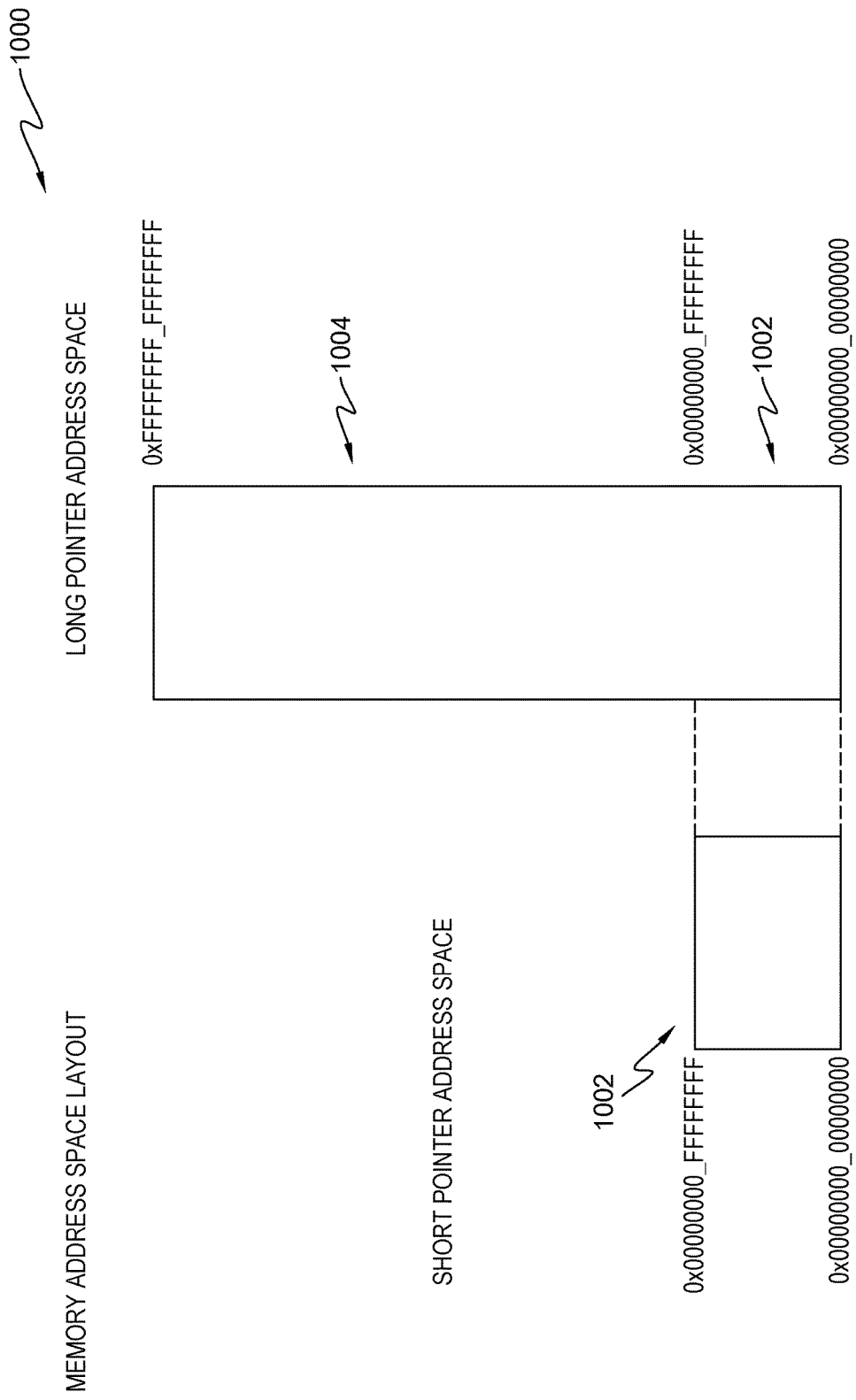
FIG. 10 depicts one example of a memory address space layout, in accordance with an aspect of the present invention.

To facilitate executing short mode applications in a long mode environment, memory address spaces are configured in particular configurations, in accordance with an aspect of the present invention. As depicted in FIG. 10, a memory address space 1000 is a long pointer address space 1004 that includes addresses 0x00000000_00000000 to 0xFFFFFFFF_FFFFFFFF. Short pointer address space 1002 is implemented in a first portion (e.g., the first 4 GB (gigabytes)) of the long pointer address space. As such, addresses 0x00000000_00000000 to 0x00000000_FFFFFFFF are addressable by short pointers.

With this configuration, short pointers may be converted to long pointers by zero extending from memory. For instance, the compiler generates code to perform the conversion, and during execution (runtime), the conversion is performed (i.e., the actual data is converted). Thus, during execution of a short pointer mode application loaded in an address space (e.g., the first portion of the address space), one or more short pointers of the short pointer mode application are converted to one or more long pointers, and the one or more long pointers are used to access memory within, e.g., the first portion of the address space addressable by short pointers. In one example, an instruction to access the memory typically accesses the long pointer address space, but because the pointer has been converted from a short pointer, it will access the first portion of the address space.

Figure 11:
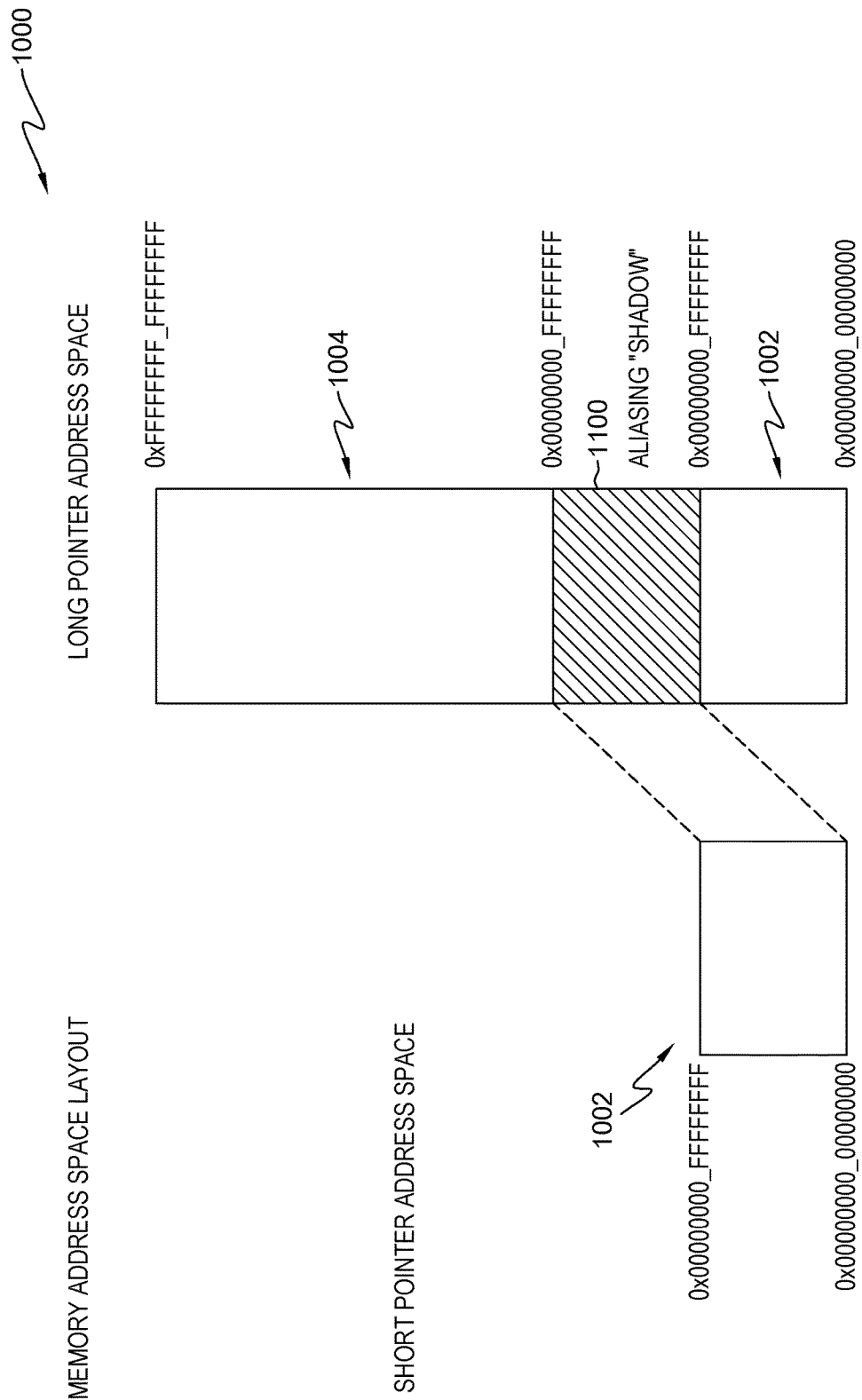
FIG. 11 depicts another example of a memory address space layout, in accordance with an aspect of the present invention.

In a further aspect, the memory space configuration may handle wrap around situations for the short pointer address space, as shown in FIG. 11. For instance, when one is added to the largest number, the result rolls over and starts again at the bottom. To manage this, a shadow section of memory 1100 is configured above the first portion 1002 of memory. This is configured, in one example, as the same size as the first portion.

With this aspect, libraries specific to short pointer applications, if any, are loaded into the range of addresses corresponding to the short addresses. Further, long pointer libraries are also loaded into this region, meaning all references that the library naturally has to its data and text are representable as short pointers, even if represented as long pointers.

In accordance with aspects of compiling a binary (i.e., an application) for short pointer mode, additional actions may be performed to ensure enhanced addressability. In one example, when library data structures are used by an application, additional steps may be taken. For example, a library may define an extern (i.e., global) pointer variable that is to be updated by a user application. As such, all bytes of a long pointer may be updated (in particular for the Big-Endian environment, although even in Little-Endian environments where the low-order bytes of a long pointer coincide with a short pointer in their entirety, an explicit clearing of the remaining bytes may be performed).

Examples of such global pointers include:
stdio.h:extern struct_IO_FILE *stdin;
stdio.h:extern struct_IO_FILE *stdout;
stdio.h:extern struct_IO_FILE *stderr;
time.h:extern char *_tzname[2];
time.h:extern char *tzname[2];
unistd.h:extern char **_environ;
unistd.h:extern char **environ;
zutil.h:extern const char *const z_errmsg[10].

Also, a library may define aggregate data types containing pointers. In those cases, a user executable is to adhere to a data layout that assigns a number of bytes that is commensurate with the long pointers (so as to keep offsets of subsequent aggregate members consistent between a long pointer library and a short pointer executable). The pointers are to be initialized correctly to place a short pointer at the corresponding long pointer location (this is implicit for a Little-Endian architecture, but a 'shift' is performed for a Big-Endian architecture, such as z/Architecture).

One example includes:

```
bits/pthreadtypes.h:
typedef struct___pthread_internal_list
{
    struct___pthread_internal_list *___prev;
    struct___pthread_internal_list *___next;
}___pthread_list_t;
```

In a short pointer program generation technique, some pointers are identified as long pointers. They are updated as a long pointer (e.g., zero-extended) reflecting the positioning of the short pointer environment in the long pointer environment (e.g., low 4 GB of the address space).

In accordance with one compiler embodiment, this may be accomplished by specifying an attribute:

```
typedef struc___pthread_internal_list
{
    struct___pthread_internal_list *___prev___attribute___(long);
    struct___pthread_internal_list *___next___attribute___(long);
}___pthread_list_t;
```

In another embodiment, this may be accomplished by scoping, e.g., using an extern grouping mechanism, such as extern property { . . . }.

This allows multiple data objects and data types to be modified:

```
extern "long" {
extern struct_IO_FILE *stdin;
extern struct_IO_FILE *stdout;
extern struct_IO_FILE *stderr;
typedef struct___pthread_internal_list
{
    struct___pthread_internal_list *___prev___attribute___(long);
    struct___pthread_internal_list *___next___attribute___(long);
}___pthread_list_t;
}
```

This scoping may be used in conjunction with preprocessor directives to update a set of header files in their entirety while enabling them to stay operable as long pointer mode headers for unmodified and unenabled code generators (e.g., compilers), for example, in conjunction with ignoring the header in an almost completely unmodified compiler equipped to ignore such directives, or in a completely unmodified compiler in conjunction using preprocessor commands, e.g., as follows:

```
#ifdef ___short_pointer_mode
extern "long" {
#endif
extern struct_IO_FILE *stdin;
extern struct_IO_FILE *stdout;
extern struct_IO_FILE *stderr;
typedef struct ___pthread_internal_list
{
    struct___pthread_internal_list *___prev___attribute___(long);
    struct___pthread_internal_list *___next___attribute___(long);
}___pthread_list_t:
#ifdef ___short_pointer_mode
}
#endif
```

In a further example, completely unmodified source text may be interpreted by specifying their individual filename, or entire directories as being subject to interpretation as long pointer mode scope, as a compiler command line parameter, as a compiler configuration file, and/or hard coded in the compiler program logic.

Short pointers are converted to long pointers by, for instance, zero extending (or otherwise modifying the pointer to locate it in the proper subspace of the address space). In a further example, short pointers are converted to long pointers by sign extension. Other possibilities also exist.

Long pointers are converted to short pointers, in at least one embodiment, by ignoring additional bits. This conversion is, e.g., automatically performed by the compiler absent intervention of a developer/user. In another embodiment, an explicit check is performed for data conversion to ensure that data is within the short pointer addressing range.

As yet a further example, long type information may be similarly handled as long pointer information, e.g., the long data type may be represented as a 32b quantity, except when in a long data mode. In one embodiment, long/short data and long/short pointer mode are separately selectable. In another embodiment, they are linked.

In another example, when multiple declarations are present, some with a long attribute and others without the long attribute, a long attribute is chosen and no error is issued, when the long attribute is detected before the first use of a declaration that has resulted in tangible and irrevocable decisions (e.g., allocating a variable with a shorter data size, or generating code making reference to the layout). In another embodiment, one of a warning and an error is generated.

In one or more aspects, an application address space is configured so as to enable execution of short pointer mode applications in conjunction with long pointer libraries. In another aspect, a short pointer mode application is also enabled to load a short pointer mode library. (In another aspect, when a long pointer mode application attempts to load a short pointer mode library, the application is terminated and an error is issued.) In accordance with one embodiment, when an application identified as a short pointer mode application is loaded, its address space is configured so as to allow it to operate safely with a short pointer representation, and without providing a full set of short pointer libraries.

In one embodiment, the system interpreter (i.e., the system component responsible for loading the application, e.g., ld.so) is configured to load 32b and 64b applications. In one embodiment, a single ld.so component is so enabled. In another embodiment, a system interpreter ld.so recognizes when a short pointer mode application is to be loaded, and initializes a short pointer application loader. In one embodiment, this may be recognized with a magic number in a program executable format indicating the application type. In another embodiment, the system interpreter may be specified using a sequence enabling the specification of an application interpreter, e.g., "#!/sbin/ld.so31" or "#!/sbin/ld.so32", as examples.

In one embodiment, a portion of the work of the short pointer loader is included in libcrt.o, or another startup module linked with the main executable, or loaded as a shared library. In accordance with such an architecture, such a component is equipped to reconfigure at least some aspects of a long pointer address space to a short pointer address space, based on loading a short pointer mode application, in accordance with an aspect of the present invention. With this reconfiguration, characteristics of an initialized 64b address space are modified to conform to characteristics described herein. (E.g., in one aspect, an application stack may be moved from a high memory location above the 0x00000000_FFFFFFFF address to a location below this address.)

Figure 12:
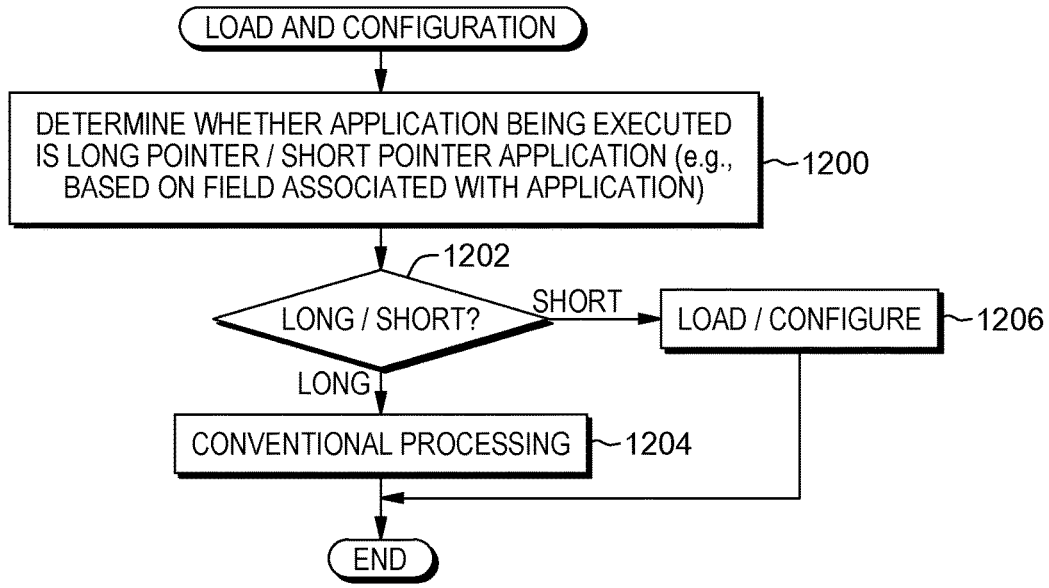
FIG. 12 depicts one example of logic to determine how to perform load and configuration, in accordance with an aspect of the present invention.

One embodiment of logic to load and configure an application address space for use by short mode applications in conjunction with long pointer mode libraries is described with reference to FIG. 12. Initially, a determination is made as to whether the application being executed uses long pointers or short pointers, STEP 1200. This is determined based on, for instance, a field associated with the application. If the application uses long pointers, INQUIRY 1202, conventional load and configuration processing is performed, STEP 1204. Otherwise, load and configuration processing, in accordance with aspects of the present invention, is performed, STEP 1206, as described below.

Figure 13:
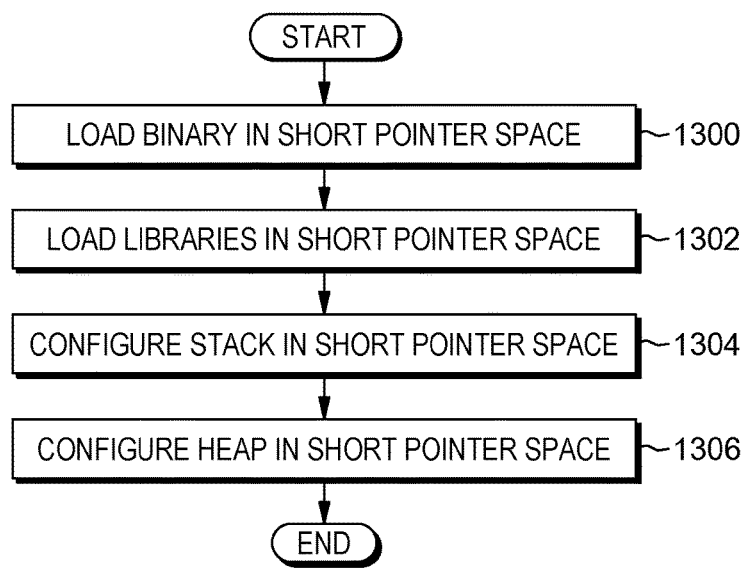
FIG. 13 depicts one embodiment of logic to perform load and configuration in a short pointer address space, in accordance with an aspect of the present invention.

Referring to FIG. 13, initially, the application binary is loaded in the short pointer address space, STEP 1300. For instance, based on an invocation of an application program compiled in short pointer mode, the short pointer loader loads the application into the low 4 GB (or the memory range that corresponds to the short pointer memory range), ensuring that all data structures within a short pointer application can be accessed via short pointers, e.g., 32b pointers. Based on the configuration, the loader also loads the libraries (e.g., long pointer libraries) in the short pointer address space, STEP 1302. The libraries are, for instance, long pointer libraries referenced by long pointers. In one particular example, a long pointer of a long pointer library is a procedure linkage table pointer.

As is known, a procedure linkage table converts position-independent function calls to absolute locations. The link-editor cannot resolve execution transfers such as function calls between different dynamic objects. So, the link-editor arranges to have the program transfer control to entries in the procedure linkage table. The runtime linker thus redirects the entries without compromising the position-independent and shareability of the program's text. Executable files and shared object files have, e.g., separate procedure linkage tables. In the case in which the long pointer is to address the portion of the address space for short pointer mode, then, in one example, the entry of the PLT is loaded with the zero extended pointer. In a further example, the architect can place some service functions (e.g., read, write, display) in the long pointer address space, leaving more address space for the short pointer applications, and then convert the pointers to access those functions. Other examples also exist.

Further, a program stack is configured in the short pointer address space, STEP 1304. The system loader initializes the stack within the short pointer address space (e.g., commonly within the high area of this address range). In another aspect, a component working in conjunction with the short pointer application receives control and relocates the stack, e.g., as part of initializing the application in crt.0 or with a hard-coded first invocation in main.

Likewise, the heap is allocated in that short pointer space, STEP 1306. The system loader sets an indication provided to the heap management library to initialize the heap below the 4 GB address. In another aspect, a separate heap management library is provided for short pointer mode programs. In accordance with the modified operation of the heap library, or the separate short pointer heap library, the heap is initialized in the short pointer memory (commonly below the allocated application stack).

In one embodiment, a dynamic loader is equipped to detect environment mismatches during linking, e.g., when a short pointer mode application attempts to call a function that includes a short pointer reference or a pointer to a short pointer among its parameters when the function is to be linked to a long pointer function equipped to operate on long pointer references to long pointers. In one embodiment, an error is generated. In another embodiment, an alternate function implementation is located, e.g., when a library may provide a select few functions adapted to handle such references, either using a wrapper in which data conversion is performed, or with a separately compiled second version of one or more functions fully equipped to handle short pointers. (In one embodiment, a long pointer compiler may include an attribute for a short pointer mode to enable the efficient writing of such code.)

Figure 14:
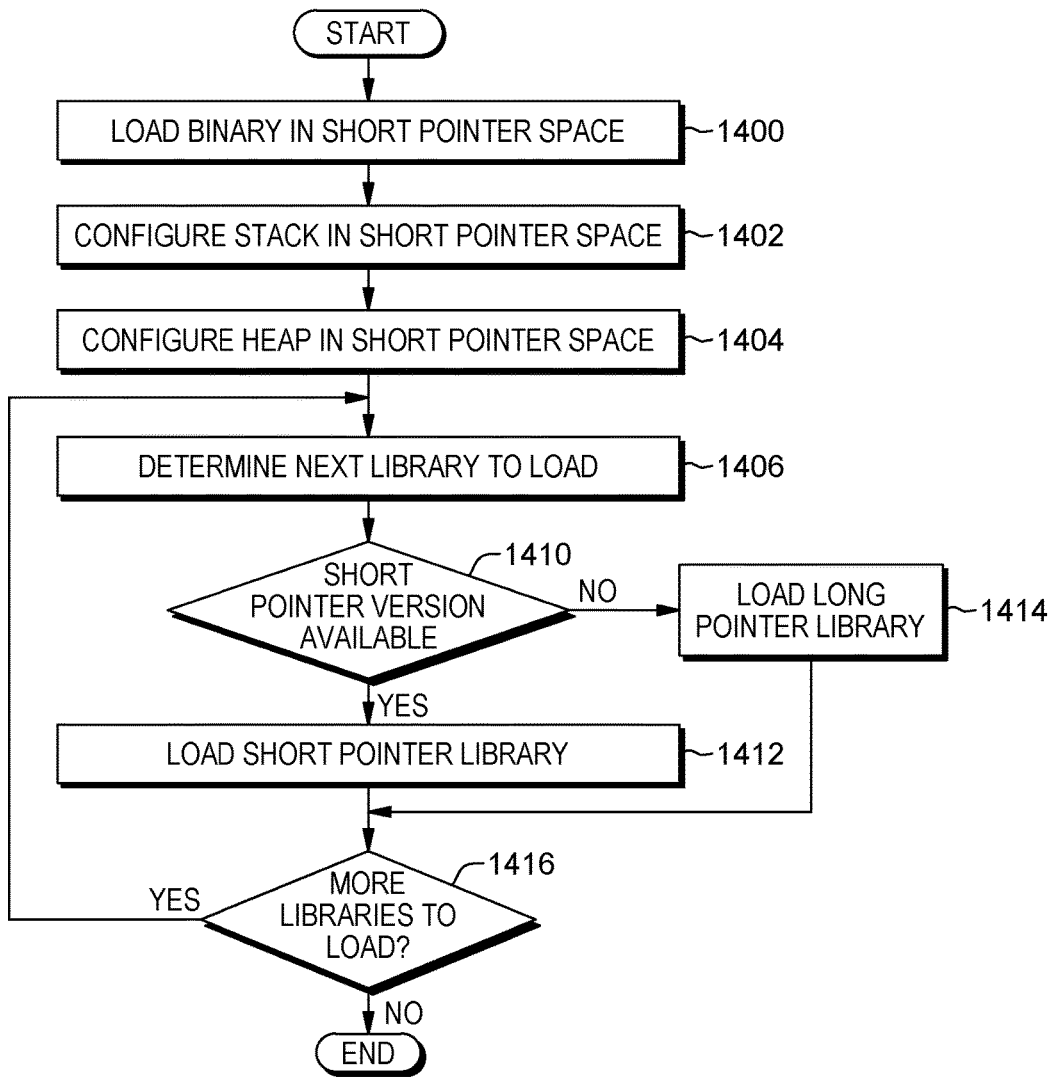
FIG. 14 depicts another embodiment of logic to perform load and configuration in a short pointer address space, in accordance with an aspect of the present invention.

In a further aspect, some libraries are provided as separate short pointer libraries (e.g., to address pointer sharing in aggregates and/or memory). One embodiment of logic to load and configure for such libraries is described with reference to FIG. 14. Initially, the application binary is loaded in the short pointer space, STEP 1400. Additionally, a program stack is configured in the short pointer space, STEP 1402, as well as a heap of memory, STEP 1404.

A determination is made as to the next library to load, STEP 1406, and a check is made as to whether a short pointer version of the library is available, INQUIRY 1410. If a short pointer version of the library is available, then it is loaded, STEP 1412; otherwise, a long pointer version of the library is loaded, STEP 1414. A further determination is then made as to whether there are additional libraries to be loaded, INQUIRY 1416. If so, then processing continues with STEP 1406. Otherwise, processing is complete.

Additionally, in a further aspect, some libraries may be built to be cognizant of executing in a 32b or a 64b environment, and thus, one or more of the configuration, behavior, data structure use, types of pointers returned, etc. may be adapted. For example, the memory management library may change where to allocate the heap and/or the size of the heap; e.g., large heap in a long pointer address space, or smaller heap in a short memory range. Other characteristics of the library may also be modified to be operable in a short mode environment.

To provide adaptability, some configuration variables may be derived from values set by the loader. For example, for memory management, boundaries of one or more address ranges for use in configuring a heap may be obtained from the loader.

Figure 15:
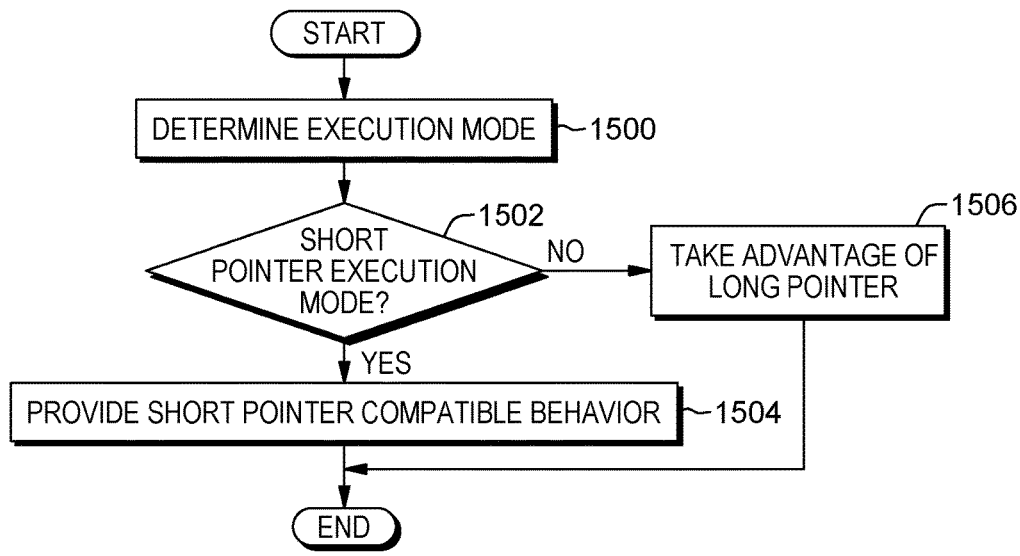
FIG. 15 depicts one example of logic to determine the execution mode, in accordance with an aspect of the preset invention.

Alternatively, in a further embodiment, the execution mode is determined, and behavior is adapted based on executing different code paths. One embodiment of logic to determine execution mode is described with reference to FIG. 15. Initially, a determination is made as to the execution mode of the application, STEP 1500. If the execution mode is a short pointer execution mode, INQUIRY 1502, then short pointer compatible behavior is provided, STEP 1504. Otherwise, long pointer mode may be taken advantage of, STEP 1506.

Figure 16:
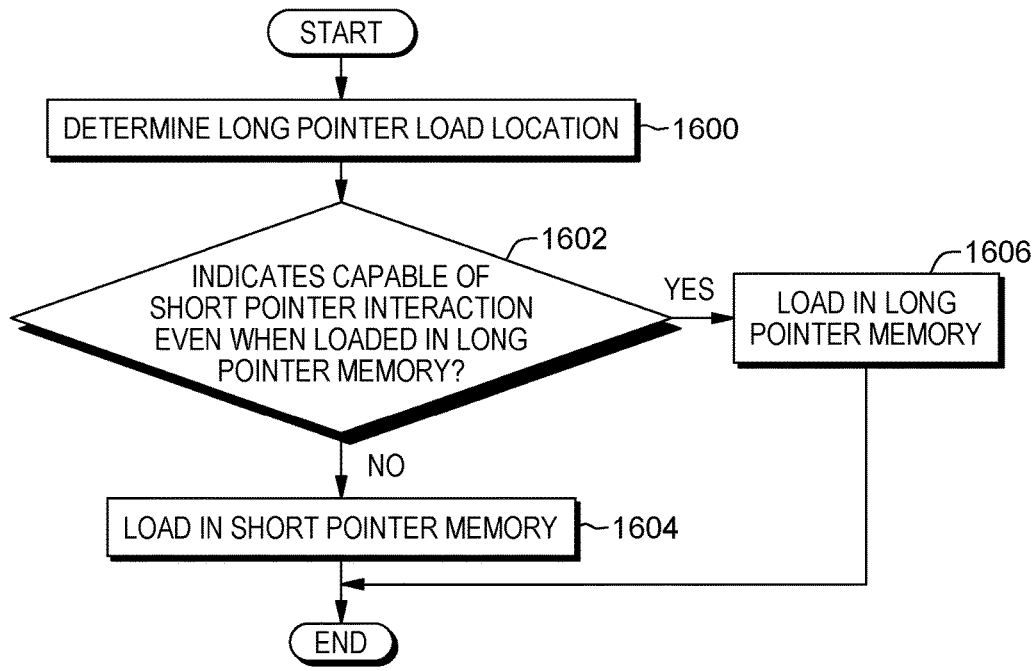
FIG. 16 depicts one embodiment of logic relating to loading pointers in memory, in accordance with an aspect of the present invention.

Further details regarding long pointer mode are described with reference to FIG. 16. Initially, the location of the long pointer load is determined, STEP 1600. Further, an inquiry is made as to whether there is an indication that short pointer interaction is available even when loaded in long pointer memory, INQUIRY 1602. This indication may be provided, e.g., in a header field of the library file, e.g., like the ELF header or a magic number that may also be used to determine whether a module is a long pointer mode or a short pointer mode module. If short pointer interaction is unavailable when loaded in long pointer memory, then the application is loaded in short pointer memory, STEP 1604. Otherwise, it is loaded in long pointer memory, STEP 1606.

In one aspect, some library services are provided from the long pointer memory (e.g., above 4 GB). To facilitate this, certain actions are performed: a short pointer address space is created; long pointer libraries are loaded into long pointer memory leaving more short pointer memory to short pointer code; a trampoline (e.g., adapting PLT (procedure linkage table) stubs) is provided for code to call a library in high memory, in which a short pointer mode application may call a code portion in the short pointer address space which in turn transfers control to code in the long pointer address space, thereby enabling short pointer mode applications to transfer control to code in the long pointer address space without being cognizant thereof; and the memory in high memory code may employ more adaptation to ensure it returns only short pointer data.

Described in detail is a capability for enabling short pointer mode applications to execute in long pointer mode environments. This capability includes configuring the memory space to enable short pointer mode applications to be executed, loading and configuring components, such as libraries, stacks, heaps, etc., in a short pointer address space, and providing an application compilation process.

By building an application that can store short pointers (e.g., 31-bit or 32-bit), the cache can hold two times the number of pointers. Further, the pointers are expanded to long pointers when loaded into the CPU (e.g., zero-extended or sign-extended in register). Thus, the short pointers may be used in a long pointer address space. As an example, a 32-bit application uses 32-bit pointers but calls 64-bit libraries.

The expansion of the pointers may be used, for instance, for all pointers of the application. The expansion is performed without complex rotations and shifts, etc.

In one aspect, an application is provided, in which the entire application module is written to use short pointers and without cognizance of long pointers, while further being adapted to call a library written exclusively with long pointers and without cognizance of short pointers.

The capability includes using short pointers in a long pointer ABI, in which short pointers may be passed to another function without cognizance of whether a function being called expects short or long pointers to be provided, without support of dedicated pointer conversion instructions, or the addition of instructions to convert a loaded pointer from a short to a long pointer.

As one example, a capability is provided to use one or more long pointer-based libraries in conjunction with short pointer code, wherein neither the calling or called module are cognizant of (or have been compiled with cognizance of) the other module not being of the same pointer type, or calling a short-pointer module from a long pointer module.

In one aspect, short pointers are used in a single address space, in which the short pointers are a compact representation for an application using a portion of a single address space. Further, an application is able to have the choice of exclusively using short pointers, while also being able to call library functions that were developed for long pointers.

Figure 17A:
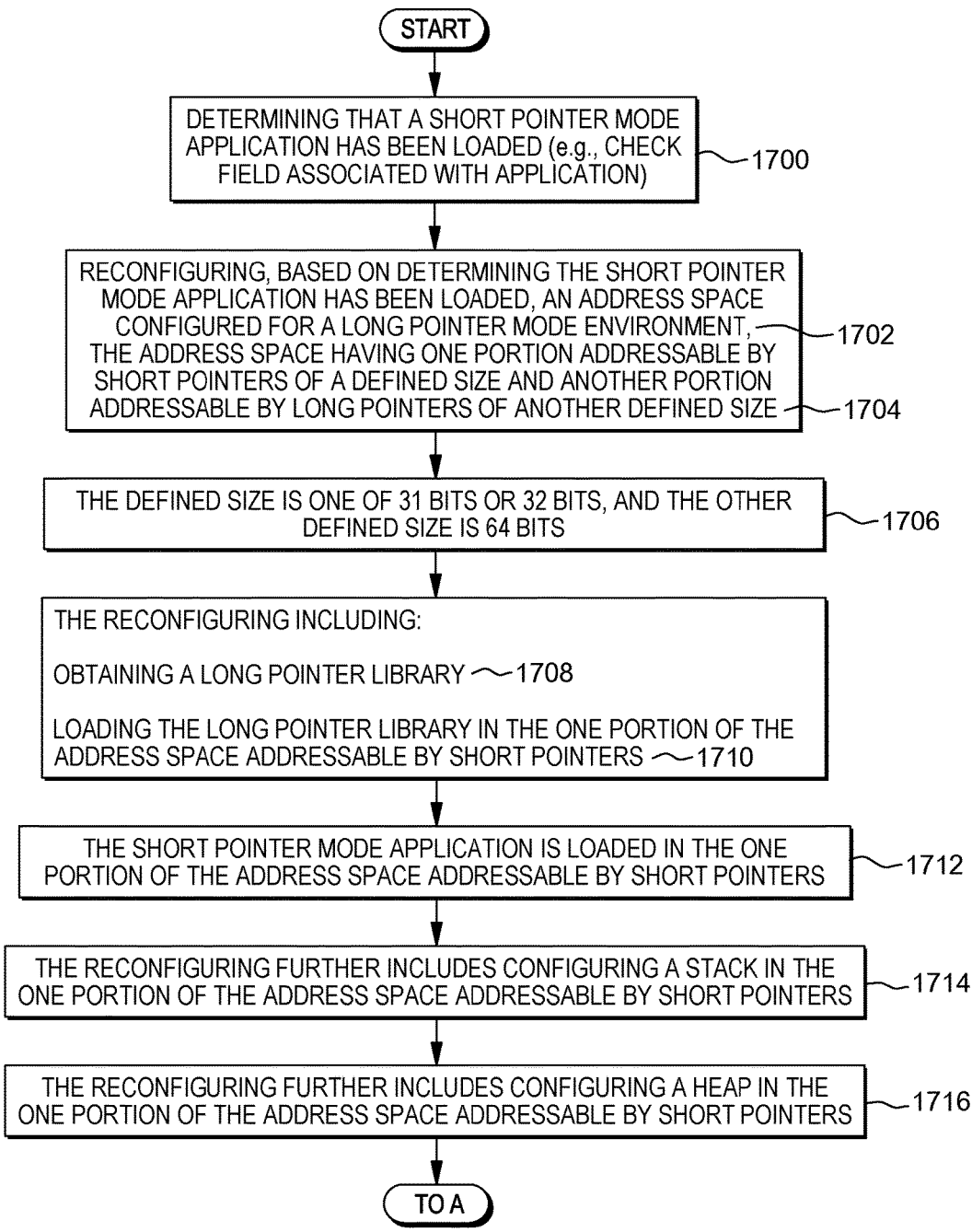
FIGS. 17A-17B depict further details relating to processing of short pointer mode applications, in accordance with an aspect of the present invention.
Figure 17B:
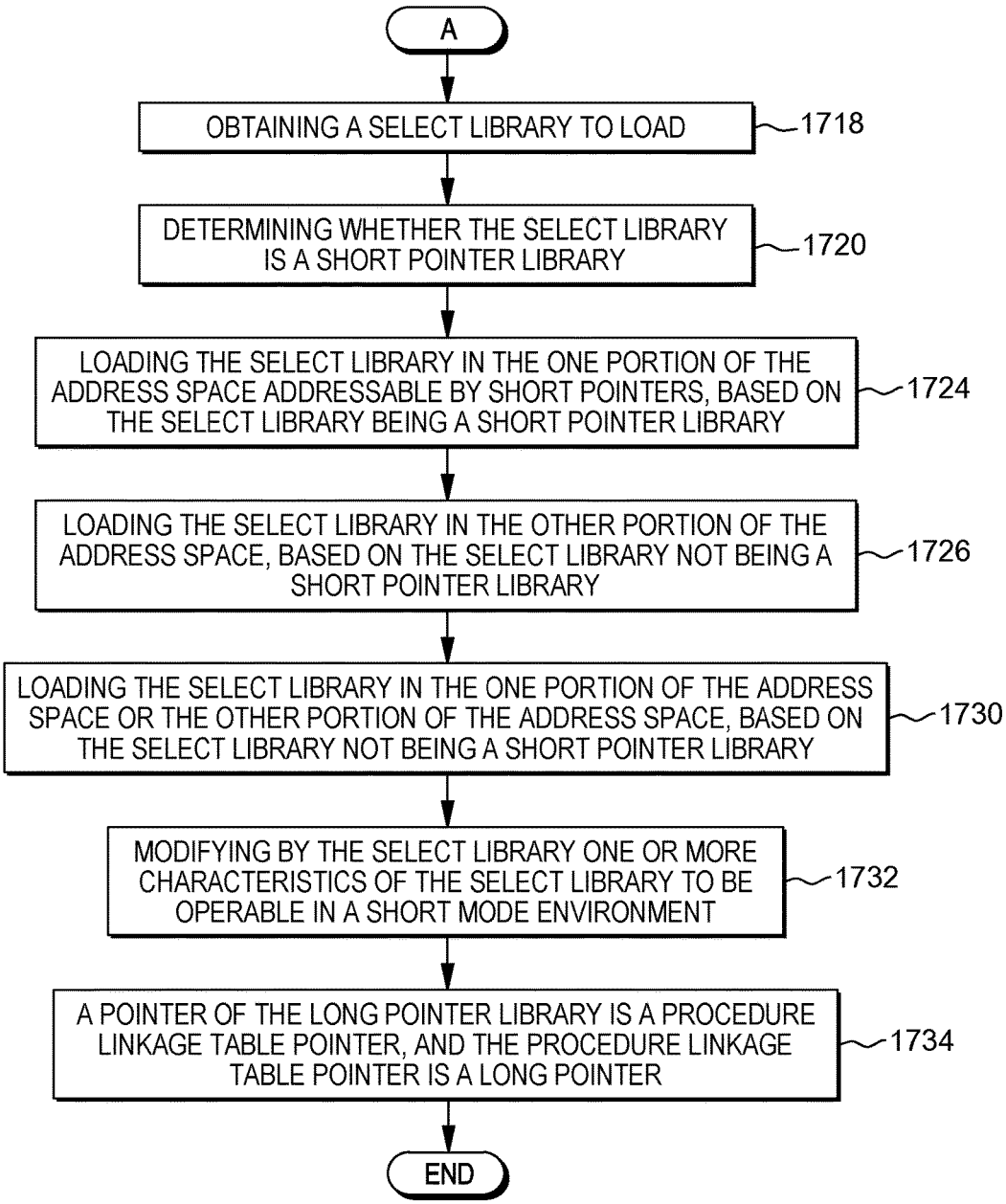

Further details relating to processing of short pointer mode applications are described with reference to FIGS. 17A-17B. Referring to FIG. 17A, in one embodiment, a determination is made (e.g., by checking a field associated with the application) that a short pointer mode application has been loaded (1700). Based on determining the short pointer mode application has been loaded, an address space configured for a long pointer mode environment is reconfigured (1702), such that the address space has one portion addressable by short pointers of a defined size and another portion addressable by long pointers of another defined size (1704). In one example, the defined size is one of 31 bits or 32 bits, and the other defined size is 64 bits (1706).

In one embodiment, the reconfiguring includes obtaining a long pointer library (1708), and loading the long pointer library in the one portion of the address space addressable by short pointers (1710). The short pointer mode application is loaded in the one portion of the address space addressable by short pointers (1712).

In one or more further embodiments, the reconfiguring includes configuring a stack in the one portion of the address space addressable by short pointers (1714), and/or configuring a heap in the one portion of the address space addressable by short pointers (1716).

In a further aspect, a select library to load is obtained (1718; FIG. 17B), and a determination is made as to whether the select library is a short pointer library (1720). Based on the select library being a short pointer library, the select library is loaded in the one portion of the address space addressable by short pointers (1724). Further, based on the select library not being a short pointer library, the select library is loaded in the other portion of the address space (1726).

In a further example, based on the select library not being a short pointer library, the select library is loaded in the one portion of the address space or the other portion of the address space (1730), and the select library modifies one or more characteristics of the select library for the select library to be operable in a short mode environment (1732).

As an example, a pointer of the long pointer library is a procedure linkage table pointer, and the procedure linkage table pointer is a long pointer (1734).

Figure 18A:
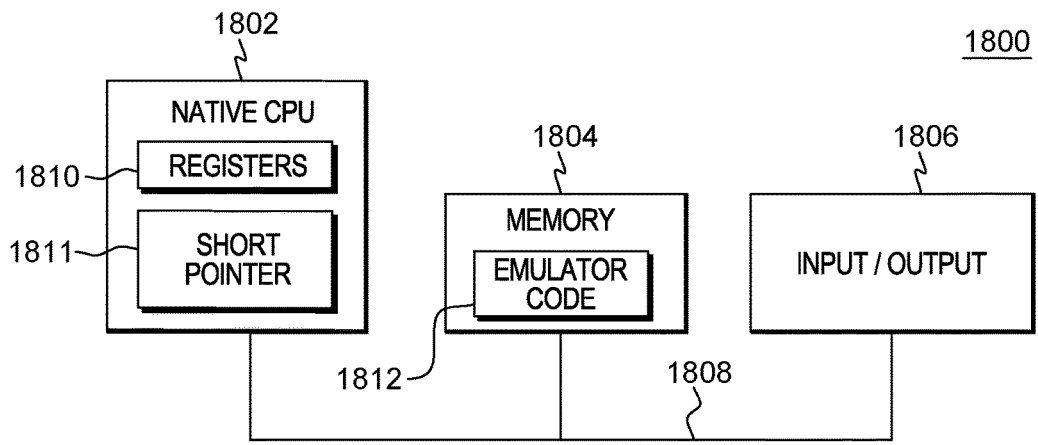
FIG. 18A depicts another example of a computing environment to incorporate and use one or more aspects of the present invention.

In addition to the above, one or more aspects of the present invention may be included and used in other types of computing environments. For instance, another example of a computing environment to incorporate and use one or more aspects of the present invention is described with reference to FIG. 18A. In this example, a computing environment 1800 includes, for instance, a native central processing unit (CPU) 1802, a memory 1804, and one or more input/output devices and/or interfaces 1806 coupled to one another via, for example, one or more buses 1808 and/or other connections. As examples, computing environment 1800 may include a z Systems server, a PowerPC processor or a Power Systems server offered by International Business Machines Corporation, Armonk, N.Y.; an HP Superdome with Intel Itanium II processors offered by Hewlett Packard Co., Palo Alto, Calif.; and/or other machines based on architectures offered by International Business Machines Corporation, Hewlett Packard, Intel, Oracle, or others.

Native central processing unit 1802 includes one or more native registers 1810, such as one or more general purpose registers and/or one or more special purpose registers used during processing within the environment, as well a short pointer mode execution facility 1811. These registers include information that represents the state of the environment at any particular point in time.

Moreover, native central processing unit 1802 executes instructions and code that are stored in memory 1804. In one particular example, the central processing unit executes emulator code 1812 stored in memory 1804. This code enables the computing environment configured in one architecture to emulate one or more other architectures. For instance, emulator code 1812 allows machines based on architectures other than the z/Architecture, such as PowerPC processors, Power Systems servers, HP Superdome servers or others, to emulate the z/Architecture and to execute software and instructions developed based on the z/Architecture.

Figure 18B:
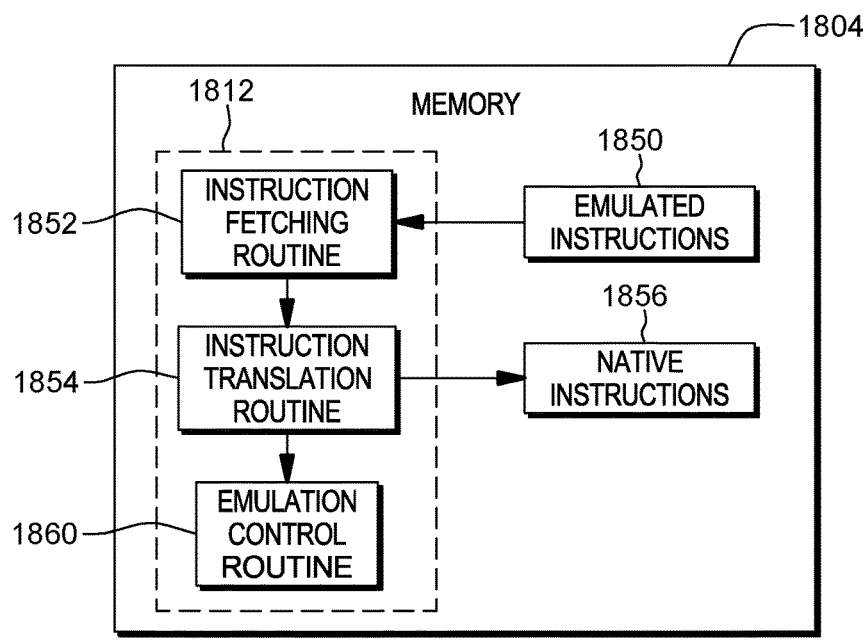
FIG. 18B depicts further details of the memory of FIG. 18A, in accordance with an aspect of the present invention.

Further details relating to emulator code 1812 are described with reference to FIG. 18B. Emulated instructions 1850 stored in memory 1804 comprise software instructions (e.g., correlating to machine instructions) that were developed to be executed in an architecture other than that of native CPU 1802. For example, emulated instructions 1850 may have been designed to execute on a z/Architecture processor, but instead, are being emulated on native CPU 1802, which may be, for example, an Intel Itanium II processor. In one example, emulator code 1812 includes an instruction fetching routine 1852 to obtain one or more emulated instructions 1850 from memory 1804, and to optionally provide local buffering for the instructions obtained. It also includes an instruction translation routine 1854 to determine the type of emulated instruction that has been obtained and to translate the emulated instruction into one or more corresponding native instructions 1856. This translation includes, for instance, identifying the function to be performed by the emulated instruction and choosing the native instruction(s) to perform that function.

Further, emulator code 1812 includes an emulation control routine 1860 to cause the native instructions to be executed. Emulation control routine 1860 may cause native CPU 1802 to execute a routine of native instructions that emulate one or more previously obtained emulated instructions and, at the conclusion of such execution, return control to the instruction fetch routine to emulate the obtaining of the next emulated instruction or a group of emulated instructions. Execution of the native instructions 1856 may include loading data into a register from memory 1804; storing data back to memory from a register; or performing some type of arithmetic or logic operation, as determined by the translation routine.

Each routine is, for instance, implemented in software, which is stored in memory and executed by native central processing unit 1802. In other examples, one or more of the routines or operations are implemented in firmware, hardware, software or some combination thereof. The registers of the emulated processor may be emulated using registers 1810 of the native CPU or by using locations in memory 1804. In embodiments, emulated instructions 1850, native instructions 1856 and emulator code 1812 may reside in the same memory or may be disbursed among different memory devices.

As used herein, firmware includes, e.g., the microcode, millicode and/or macrocode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

Moreover, one or more aspects may relate to cloud computing.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 19:
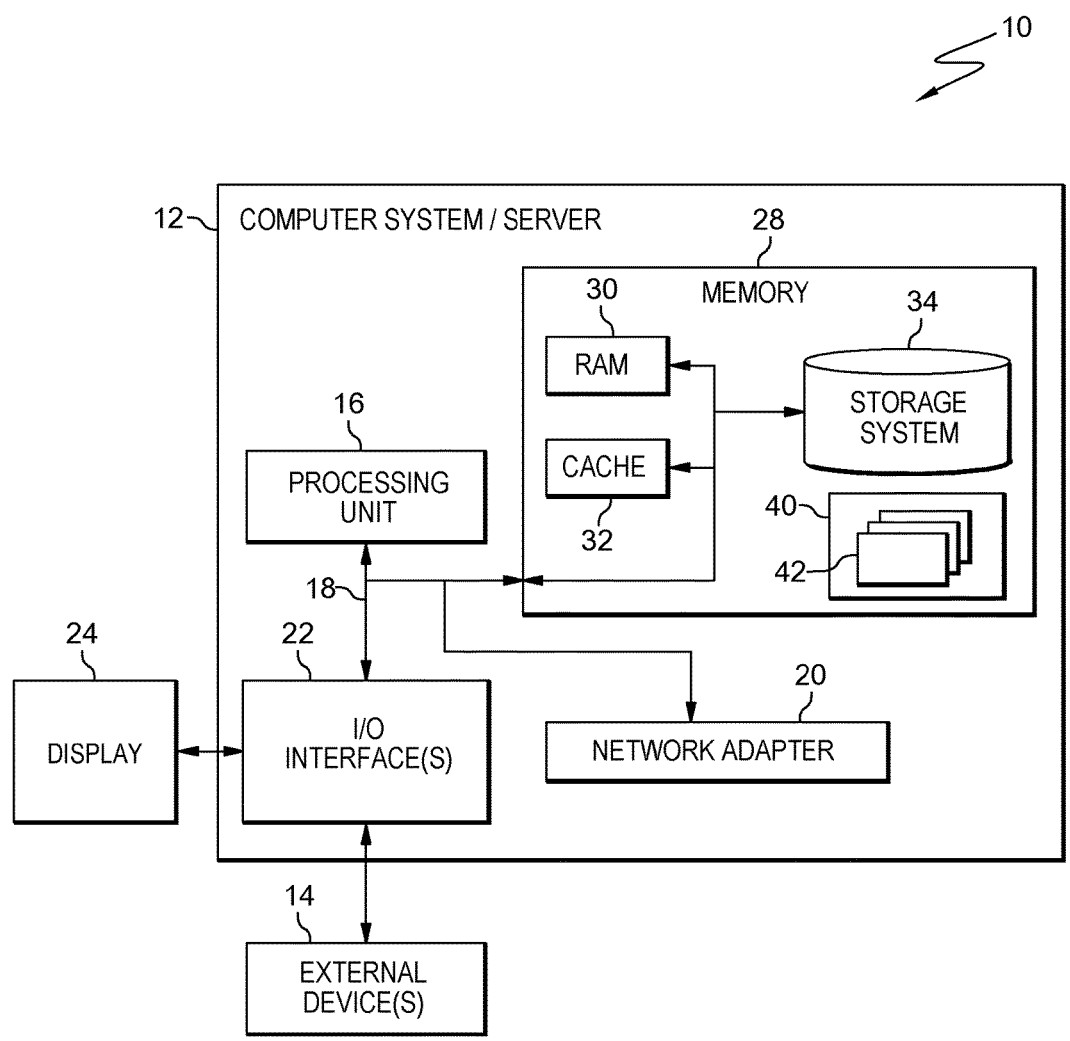
FIG. 19 depicts one embodiment of a cloud computing node.

Referring now to FIG. 19, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 19, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 20:
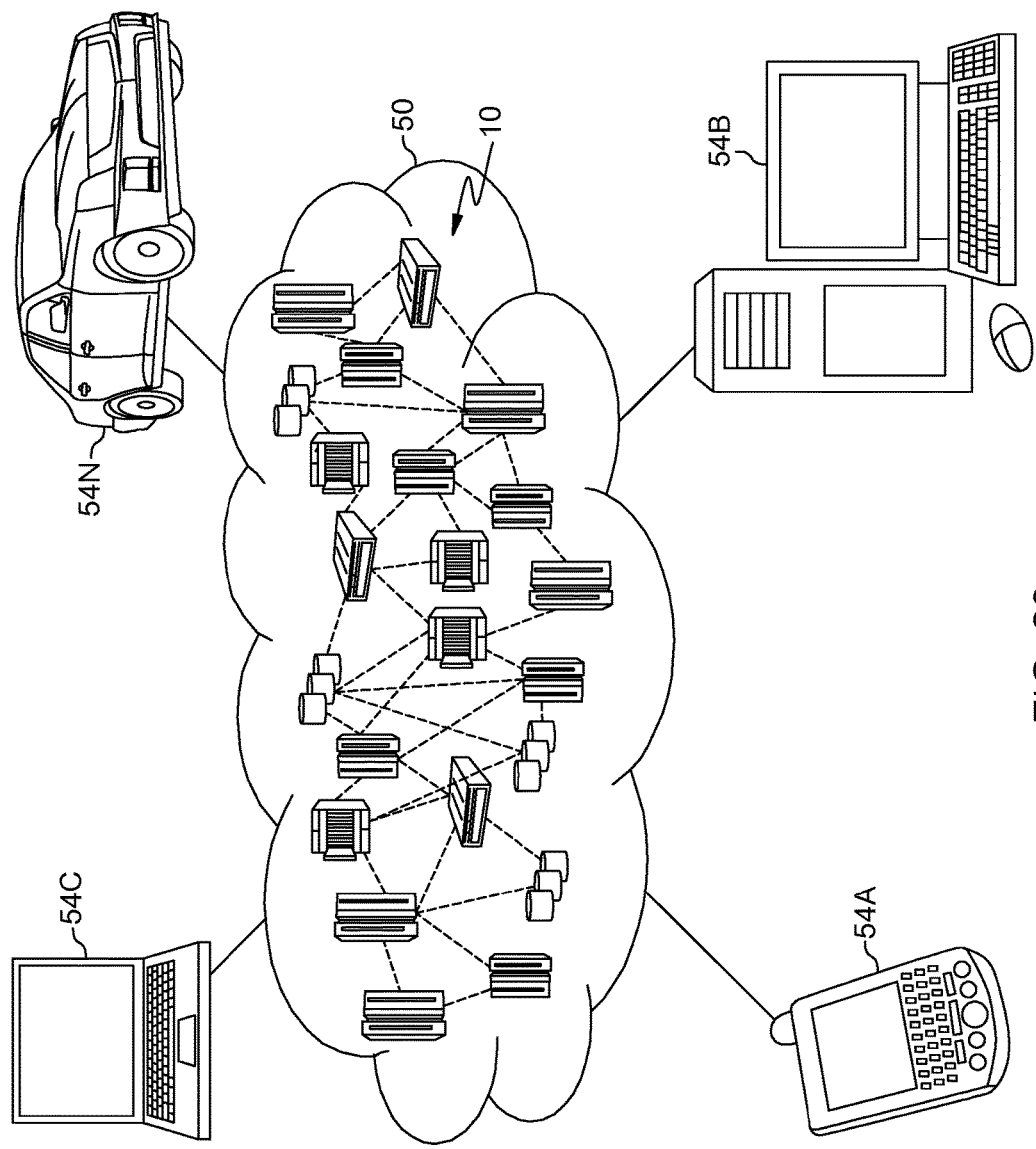
FIG. 20 depicts one embodiment of a cloud computing environment.

Referring now to FIG. 20, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 20 are intended to be illustrative only and that computing nodes 10 and cloud computing environment 50 can communicate with any type of computerized device over any type of network and/or network addressable connection (e.g., using a web browser).

Figure 21:
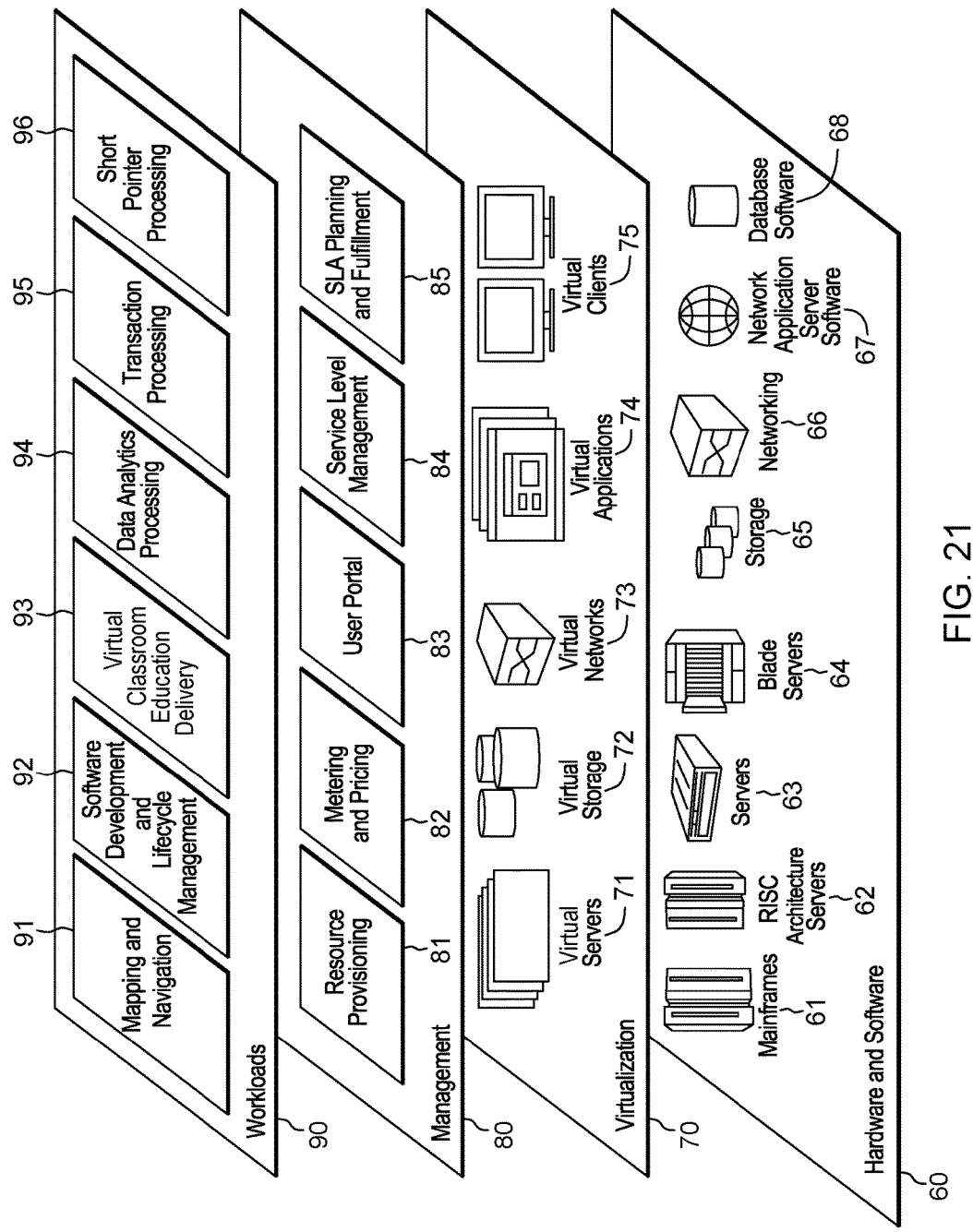
FIG. 21 depicts one example of abstraction model layers.

Referring now to FIG. 21, a set of functional abstraction layers provided by cloud computing environment 50 (FIG. 20) is shown. It should be understood in advance that the components, layers, and functions shown in FIG. 21 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and short pointer mode execution processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing in a computing environment, said computer program product comprising:
    a computer readable storage medium readable by a processing circuit and storing instructions for performing a method comprising:
        determining that a short pointer mode application has been loaded;
        reconfiguring, based on determining the short pointer mode application has been loaded, an address space configured for a long pointer mode environment, the address space having one portion addressable by short pointers of a defined size and another portion addressable by long pointers of another defined size, the reconfiguring comprising:
            obtaining a long pointer library; and
            loading the long pointer library in the one portion of the address space addressable by short pointers;
        determining whether a short pointer is to be used as a private pointer in a short pointer binary or as a shared pointer with a long pointer binary; and
        sharing the short pointer with the long pointer library, based on determining the short pointer is to be used as a shared pointer.

2. The computer program product of claim 1, wherein the short pointer mode application is loaded in the one portion of the address space addressable by short pointers.

3. The computer program product of claim 1, wherein the reconfiguring further comprises configuring a stack in the one portion of the address space addressable by short pointers.

4. The computer program product of claim 1, wherein the reconfiguring further comprises configuring a heap in the one portion of the address space addressable by short pointers.

5. The computer program product of claim 1, wherein the method further comprises:
    obtaining a select library to load;
    determining whether the select library is a short pointer library; and
    loading the select library in the one portion of the address space addressable by short pointers, based on the select library being a short pointer library.

6. The computer program product of claim 5, wherein the method further comprises loading the select library in the other portion of the address space, based on the select library not being a short pointer library.

7. The computer program product of claim 5, wherein the method further comprises:
    loading the select library in the one portion of the address space or the other portion of the address space, based on the select library not being a short pointer library; and
    modifying by the select library one or more characteristics of the select library for the select library to be operable in a short mode environment.

8. The computer program product of claim 1, wherein the defined size is one of 31 bits or 32 bits, and the other defined size is 64 bits.

9. The computer program product of claim 1, wherein the determining includes checking a field associated with the application.

10. The computer program product of claim 1, wherein a pointer of the long pointer library is a procedure linkage table pointer, and the procedure linkage table pointer is a long pointer.

11. A computer system for facilitating processing in a computing environment, said computer system comprising:
    a memory; and
    a processor in communication with the memory, wherein the computer system is configured to perform a method, said method comprising:
        determining that a short pointer mode application has been loaded;
        reconfiguring, based on determining the short pointer mode application has been loaded, an address space configured for a long pointer mode environment, the address space having one portion addressable by short pointers of a defined size and another portion, addressable by long pointers of another defined size, the reconfiguring comprising:
            obtaining a long pointer library; and
            loading the long pointer library in the one portion of the address space addressable by short pointers;
        determining whether a short pointer is to be used as a private pointer in a short pointer binary or as a shared pointer with a long pointer binary; and
        sharing the short pointer with the long pointer library, based on determining the short pointer is to be used as a shared pointer.

12. The computer system of claim 11, wherein the short pointer mode application is loaded in the one portion of the address space addressable by short pointers.

13. The computer system of claim 11, wherein the reconfiguring further comprises configuring a stack in the one portion of the address space addressable by short pointers.

14. The computer system of claim 11, wherein the reconfiguring further comprises configuring a heap in the one portion of the address space addressable by short pointers.

15. The computer system of claim 11, wherein the method further comprises:

loading the select library in the one portion of the address space or the other portion of the address space, based on the select library not being a short pointer library; and modifying by the select library one or more characteristics of the select library for the select library to be operable in a short mode environment.

16. A computer-implemented method of facilitating processing in a computing environment, said computer-implemented method comprising:

determining, by a processor, that a short pointer mode application has been loaded;

reconfiguring, based on determining the short pointer mode application has been loaded, an address space configured for a long pointer mode environment, the address space having one portion addressable by short pointers of a defined size and another portion addressable by long pointers of another defined size, the reconfiguring comprising:
obtaining a long pointer library; and
loading the long pointer library in the one portion of the address space addressable by short pointers;

determining whether a short pointer is to be used as a private pointer in a short pointer binary or as a shared pointer with a long pointer binary; and sharing the short pointer with the long pointer library, based on determining the short pointer is to be used as a shared pointer.

17. The computer-implemented method of claim 16, wherein the short pointer mode application is loaded in the one portion of the address space addressable by short pointers.

18. The computer-implemented method of claim 16, wherein the reconfiguring further comprises configuring a stack in the one portion of the address space addressable by short pointers.

19. The computer-implemented method of claim 16, wherein the reconfiguring further comprises configuring a heap in the one portion of the address space addressable by short pointers.

20. The computer-implemented method of claim 16, further comprising:

loading the select library in the one portion of the address space or the other portion of the address space, based on the select library not being a short pointer library; and modifying by the select library one or more characteristics of the select library for the select library to be operable in a short mode environment.

* * * * *